US011119510B2

(12) United States Patent
Saunders et al.

(10) Patent No.: US 11,119,510 B2
(45) Date of Patent: Sep. 14, 2021

(54) SYSTEMS AND METHODS FOR GENERATING FLIGHT PATHS FOR NAVIGATING AN AIRCRAFT

(71) Applicant: Aurora Flight Sciences Corporation, a subsidiary of The Boeing Company, Manassas, VA (US)

(72) Inventors: Jeffery Saunders, Quincy, MA (US); John F. Langford, Fairfax, VA (US); Jason T. Jewell, Herndon, VA (US)

(73) Assignee: AURORA FLIGHT SCIENCES CORPORATION, A SUBSIDIARY OF THE BOEING COMPANY, Manassas, VA (US)

( * ) Notice: Subject to any disclaimer, the term of this patent is extended or adjusted under 35 U.S.C. 154(b) by 202 days.

(21) Appl. No.: 16/524,901

(22) Filed: Jul. 29, 2019

(65) Prior Publication Data
US 2021/0034076 A1    Feb. 4, 2021

(51) Int. Cl.
*G06F 17/10*    (2006.01)
*G06G 7/78*    (2006.01)
(Continued)

(52) U.S. Cl.
CPC .............. *G05D 1/106* (2019.05); *G05D 1/102* (2013.01); *G08G 5/0039* (2013.01); *G08G 5/0086* (2013.01); *G08G 5/04* (2013.01)

(58) Field of Classification Search
CPC ...... G05D 1/106; G05D 1/102; G05D 1/0653; G05D 1/0676; G08G 5/0039; G08G 5/0086; G08G 5/04; G08G 5/006
See application file for complete search history.

(56) References Cited

U.S. PATENT DOCUMENTS

| 9,162,753 | B1 | 10/2015 | Panto et al. |
| 9,262,929 | B1 * | 2/2016 | Roy ..................... G06Q 10/047 |

(Continued)

FOREIGN PATENT DOCUMENTS

JP    2019 053765    4/2019

OTHER PUBLICATIONS

Extended European Search Report prepared by the European Patent Office in application No. EP 20 18 4742.3 dated Nov. 26, 2020.

*Primary Examiner* — Abby Y Lin
*Assistant Examiner* — Sohana Tanju Khayer
(74) *Attorney, Agent, or Firm* — McDonnell Boehnen Hulbert & Berghoff LLP

(57) ABSTRACT

In an example, a method of generating flight paths for navigating an aircraft is provided. The method includes hovering the aircraft at a predetermined hover point. The predetermined hover point corresponds to a first takeoff waypoint of a first trajectory of the aircraft. The method includes scanning at least a portion of a first flight path of the first trajectory. The method includes determining that an obstacle obstructs the first flight path of the first trajectory. The first flight path begins at the first takeoff waypoint. The method includes determining a second takeoff waypoint. Determining the second takeoff waypoint includes assigning the first flight path to begin at the second takeoff waypoint. The method includes changing the first flight path of the first trajectory in accordance with the second takeoff waypoint, thereby forming a second flight path of a second trajectory. The method includes causing the aircraft to follow the second flight path of the second trajectory from the second takeoff waypoint.

20 Claims, 15 Drawing Sheets

(51) Int. Cl.
*G06G 1/16* (2006.01)
*G05D 1/10* (2006.01)
*G08G 5/00* (2006.01)
*G08G 5/04* (2006.01)

(56) References Cited

U.S. PATENT DOCUMENTS

| | | | |
|---|---|---|---|
| 2010/0274419 A1* | 10/2010 | Lacombe | G08G 5/0065 701/4 |
| 2015/0323932 A1* | 11/2015 | Paduano | G05D 1/0676 701/3 |
| 2016/0042637 A1* | 2/2016 | Cahill | H04W 4/029 701/3 |
| 2016/0070265 A1* | 3/2016 | Liu | G01C 21/00 701/3 |
| 2016/0364248 A1* | 12/2016 | Zimmerman | G08G 5/0069 |
| 2017/0269588 A1* | 9/2017 | Lema | G05D 1/0094 |
| 2018/0129635 A1* | 5/2018 | Saptharishi | G06F 3/04817 |
| 2019/0035291 A1* | 1/2019 | Saxena | G01S 17/87 |
| 2019/0235502 A1* | 8/2019 | Lindsey | G08G 5/0034 |
| 2020/0004320 A1* | 1/2020 | Leppanen | G06F 3/041 |
| 2020/0073412 A1* | 3/2020 | McNair | B64D 45/04 |
| 2020/0286388 A1* | 9/2020 | Velastri | G08G 5/0034 |

* cited by examiner

SYSTEMS AND METHODS FOR GENERATING FLIGHT PATHS FOR NAVIGATING AN AIRCRAFT

FIELD

The present disclosure relates generally to operation of an aircraft, and more particularly, to systems and method for generating flight paths for navigating the aircraft.

BACKGROUND

An aircraft capable of hovering in place, such as a helicopter or a vertical and/or short take-off and landing (V/STOL) aircraft can approach takeoff and landing differently than aircraft that use a runway. In particular, such aircraft are not tied to a path associated with the runway, but can hover and rotate prior to takeoff or landing. This allows these aircraft to takeoff and/or land in restrictive environment having multiple obstructions.

Manned flights with aircraft capable of hovering in place rely on the experience and intuition of a pilot, and automating these flights, particularly in takeoff and landing contexts, presents difficulties. For example, systems are expected to avoid obstacles while maintaining aircraft stability and a smooth flight path to preserve passenger comfort, and to do so within different flight contexts. Existing systems and methods for automated flight path planning may struggle to bridge these needs in adaptability, comfort, and consistency.

What is needed is a system for automatically generating flight paths for navigating an aircraft, particularly in takeoff and landing contexts.

SUMMARY

In an example, a method of generating flight paths for navigating an aircraft is described. The method comprises hovering the aircraft at a predetermined hover point, wherein the predetermined hover point corresponds to a first takeoff waypoint of a first trajectory of the aircraft. The method comprises scanning, by one or more sensors associated with the aircraft, at least a portion of a first flight path of the first trajectory. The method comprises using sensor data obtained by the one or more sensors, determining that an obstacle obstructs the first flight path of the first trajectory, wherein the first flight path begins at the first takeoff waypoint. The method comprises responsive to determining that the obstacle obstructs the first flight path, using the sensor data, determining a second takeoff waypoint, wherein determining the second takeoff waypoint comprises assigning the first flight path to begin at the second takeoff waypoint, and changing the first flight path of the first trajectory in accordance with the second takeoff waypoint by translating the first flight path to align with the second takeoff waypoint and rotating the first flight path to avoid the obstacle from obstructing the first flight path, thereby forming a second flight path of a second trajectory. The method comprises causing the aircraft to follow the second flight path of the second trajectory from the second takeoff waypoint.

In another example, a system for generating flight paths for navigating an aircraft is described. The system comprises an aircraft. The aircraft comprises one or more sensors and a computing device having a processor and memory storing instructions executable by the processor to perform functions. The instructions are executable by the processor to hover the aircraft at a predetermined hover point, wherein the predetermined hover point corresponds to a first takeoff waypoint of a first trajectory of the aircraft. The instructions are executable by the processor to scan, by one or more sensors associated with the aircraft, at least a portion of a first flight path of the first trajectory. The instructions are executable by the processor to using sensor data obtained by the one or more sensors, determine that an obstacle obstructs the first flight path of the first trajectory, wherein the first flight path begins at the first takeoff waypoint. The instructions are executable by the processor to responsive to determining that the obstacle obstructs the first flight path, using the sensor data, determine a second takeoff waypoint, wherein determining the second takeoff waypoint comprises assigning the first flight path to begin at the second takeoff waypoint, and change the first flight path of the first trajectory in accordance with the second takeoff waypoint by translating the first flight path to align with the second takeoff waypoint and rotating the first flight path to avoid the obstacle from obstructing the first flight path, thereby forming a second path of a second trajectory. The instructions are executable by the processor to cause the aircraft to follow the second flight path of the second trajectory from the second takeoff waypoint.

In another example, a non-transitory computer readable medium having stored thereon instructions, that when executed by one or more processors of a computing device, cause the computing device to perform functions are described. The functions comprise hovering an aircraft at a predetermined hover point, wherein the predetermined hover point corresponds to a first takeoff waypoint of a first trajectory of the aircraft. The functions comprise scanning, by one or more sensors associated with the aircraft, at least a portion of a first flight path of the first trajectory. The functions comprise using sensor data obtained by the one or more sensors, determining that an obstacle obstructs the first flight path of the first trajectory, wherein the first flight path begins at the first takeoff waypoint. The functions comprise, responsive to determining that the obstacle obstructs the first flight path, (i) using the sensor data, determining a second takeoff waypoint, wherein determining the second takeoff waypoint comprises assigning the first flight path to begin at the second takeoff waypoint, and (ii) changing the first flight path of the first trajectory in accordance with the second takeoff waypoint by translating the first flight path to align with the second takeoff waypoint and rotating the first flight path to avoid the obstacle from obstructing the first flight path. The functions comprise causing the aircraft to follow the flight path of the first trajectory from the second takeoff waypoint.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1A:
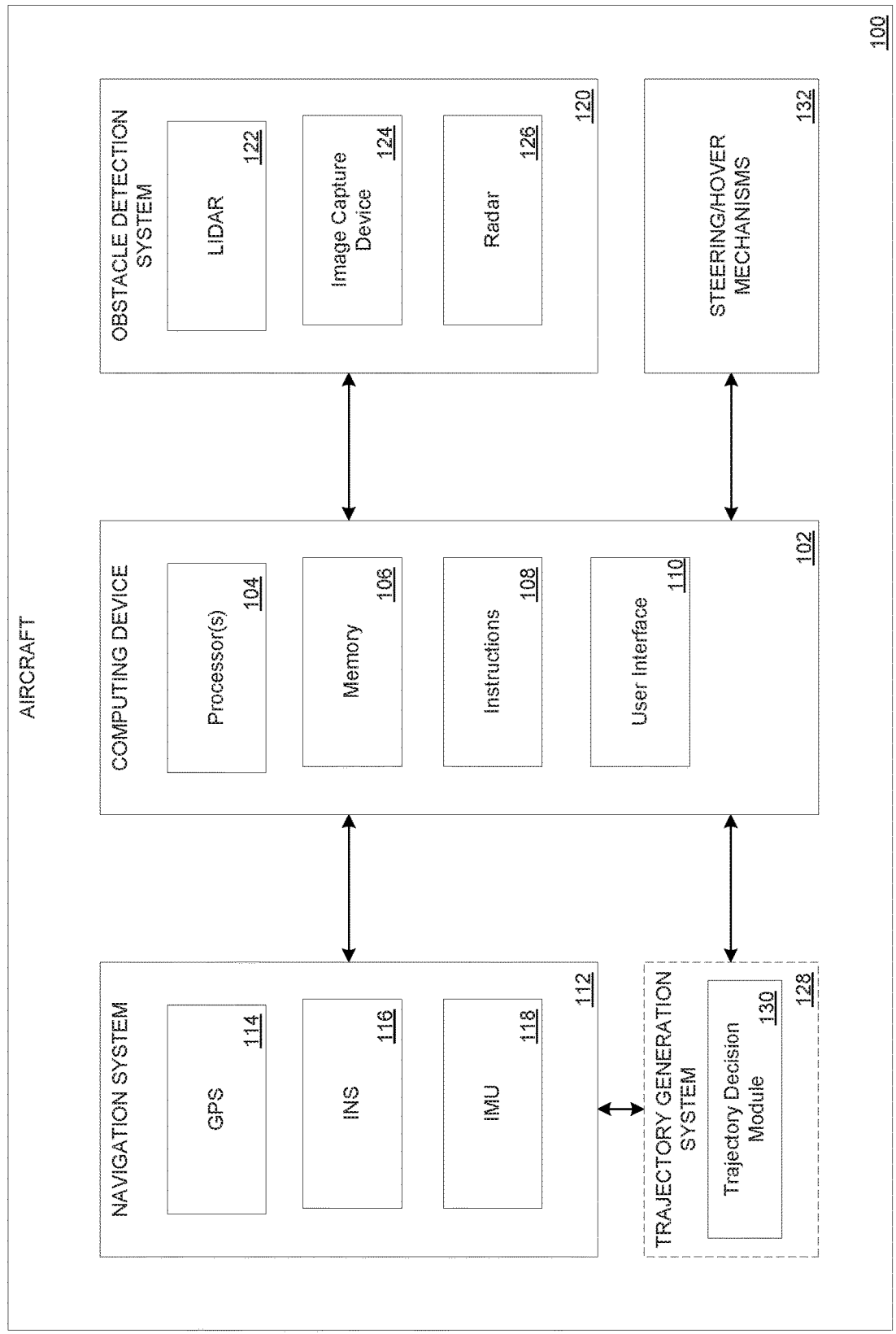
FIG. 1A illustrates a block diagram of an aircraft, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, systems and methods for generating flight paths for navigating an aircraft are described. More particularly, methods and systems are described for doing so automatically. For purposes of the following description, the terms "automatically" or "autonomously" may involve carrying out the functions programmatically based on sensor data, stored information, machine learning techniques, or the like, without user input and/or instructions. Within this context, functions may still be referred to as automatic or autonomous if they are prompted at some point by user actions.

Within examples, an aircraft may use a predetermined trajectory for takeoff. The predetermined trajectory may predictably, reliably, and comfortably facilitate ascent of the aircraft towards a cruising altitude. In other words, the predetermined trajectory may resemble that of a human pilot. When taking off however, an aircraft, particularly an aircraft that does not use a runway, may encounter various obstacles, such as trees, hills, structures, or the like. Recognizing and avoiding such obstacles allows the aircraft to ascend without colliding into such objects. However, doing so automatically may cause the aircraft to take a jerky or uneven path that causes items to shift in the aircraft and reduces comfort of passengers. Further, avoiding these obstacles by changing the flight path of the predetermined trajectory may, depending on the obstacle, result in untested or less-predicable flight paths. Accordingly, within examples, the aircraft may change a waypoint associated with taking off, but otherwise maintain the flight path of the predetermined trajectory. Thus, examples are described that allow an aircraft to takeoff without sacrificing comfort or reliability.

Within further examples, protocols for flight path selection may change in accordance with a flight context of the aircraft. For instance, the aircraft may use a first protocol for taking off, use a second protocol while cruising, and use a third protocol while landing. For example, while taking off, the aircraft may use a brute force approach to flight path generation and selection that selects from a set of possible flight paths within a set of constraints (e.g., to conserve computational resources), while cruising, the aircraft may use a Rapidly Expanding Random Tree (RRT) for flight path generation and selection, and while landing, the aircraft may use a combination of the brute force approach and the RRT approach. Thus, examples are described that allow for robust flight path solutions using protocols that are be particularly suited to each given context.

Turning now to the figures, FIG. 1A illustrates a block diagram of an aircraft 100, according to an example implementation. The aircraft 100 includes a computing device 102, a navigation system 112, an obstacle detection system 120, a trajectory generation system 128, and steering/hover mechanisms 132. Other devices, systems, devices, modules, software, data stores, and the like can also be included. Further, within examples, various components described with respect to FIG. 1A may be integrated into a singular computing device or system, separated into further discrete components, or otherwise rearranged to achieve similar functionality to that described herein. Further, various systems, devices, and mechanisms, can be implemented in either a software or hardware context.

The computing device 102 includes one or more processor(s) 104, a memory 106, instructions 108, and a user interface 110. The one or more processor(s) 104 may be general-purpose processors or special purpose processors (e.g., digital signal processors, application specific integrated circuits, etc.). The one or more processor(s) 104 can be configured to execute the instructions 108 (e.g., computer-readable program instructions) that are stored in the memory 106 and are executable to provide the functionality of computing device 102, and related systems and methods described herein.

The memory 106 may include or take the form of one or more computer-readable storage media that can be read or accessed by the processor(s) 104. The computer-readable storage media can include volatile and/or non-volatile storage components, such as optical, magnetic, organic or other memory or disc storage, which can be integrated in whole or in part with the processor(s) 104. The memory 106 is considered non-transitory computer readable media. In some examples, the memory 106 can be implemented using a single physical device (e.g., one optical, magnetic, organic or other memory or disc storage unit), while in other examples, the memory 106 can be implemented using two or more physical devices. The memory 106 thus is a non-transitory computer readable storage medium, and instructions 108 executable by the processor(s) 104 are stored on the memory 106. The instructions 108 include computer executable code, and can be executed by the processor(s) 104 to achieve functionality described herein.

The user interface 110 may include a mouse, a keyboard, a touchscreen, a microphone, a gesture recognition system, a combination thereof, or any other means of receiving user input. In particular, the user interface 110 may be configured to receive input from a pilot of the aircraft 100, or a remote technician of the aircraft 100, for example.

As shown in FIG. 1A, the computing device 102 is communicatively coupled to the navigation system 112, the obstacle detection system 120, the trajectory generation system 128, and the steering/hover mechanisms 132. Though not depicted in FIG. 1A, each of these components of the aircraft 100 may include processor(s), memory, and instructions configured similarly to the one or more processor(s) 104, the memory 106, and the instructions 108 as described above, though each may include instructions executable to achieve a distinct functionality. Further, though these components are not depicted as being in direct communication (rather, they are shown being in communication via the computing device 102), each of these components may directly communicate with one another, or operate independently without receiving communications from one another.

The navigation system 112 includes a Global Positioning System (GPS) 114, an Inertial Navigation System (INS) 116, and an Inertial Measurement Unit (IMU) 118. The navigation system 112 and/or one or more of its components is configured to determine a location, an orientation, and an altitude of the aircraft 100. More particularly, one or more of the GPS 114, the INS 116, and the IMU 118 may obtain sensor data indicative of a location, orientation, and altitude (though not depicted, an altimeter, for example, may also be included) of the aircraft 100. This information, either in the form of unprocessed sensor data, or as targeted information indicative of the location, orientation, and altitude of the aircraft 100, may be transmitted to the computing device 102. For example, the navigation system 112 may transmit a simplified representation of the sensor data. As described below, the computing device 102 and/or one or more additional components of the aircraft 100 may use this information in generating and selecting a flight path for the aircraft 100.

The obstacle detection system 120 includes a Light Detection and Ranging (LIDAR) device 122, an image capture device 124 (e.g., a camera, light sensor array, or another imaging device or system), and a radar device 126. Other devices may be included as well. The obstacle detection system 120 and/or one or more of its components, is configured for obtaining sensor data indicative of an environment of the aircraft 100. For example, one or more of the LIDAR device, image capture device, and the radar device 126 may periodically scan an area surrounding the aircraft 100, such as an area corresponding to a planned flight path, to obtain data indicative of any objects, or lack thereof, within the environment. The sensor data may include three-dimensional (3D) point cloud data, image data, or other data that indicates whether an object (e.g., an obstacle) is present. This information, either in the form of unprocessed sensor data, or as targeted information indicative of the environment surrounding the aircraft 100, may be transmitted to the computing device 102. For example, the obstacle detection system may transmit a simplified representation of the sensor data, such as relative coordinates of a detected obstacle. As described below, the computing device 102 and/or one or more additional components of the aircraft 100 may use this information in generating and selecting a flight path for the aircraft 100.

The trajectory generation system 128 includes a trajectory decision module 130. The generation system may receive information from the navigation system 112 and from the computing device 102 to determine a trajectory including a flight path for the aircraft to follow. The trajectory generation system 128 may be a standalone computing device, or alternatively be included as part of the computing device 102, the navigation system 112, or any other component of the aircraft 100. Further details relating to the trajectory generation system 128 and the trajectory decision module 130 are described below with respect to FIG. 1B.

The steering/hover mechanisms 132 may include one or more rotors, thrusters, stabilizers, ailerons, elevators, or other controllable operational devices of the aircraft 100. The computing device 102 may send control signals to the steering/hover mechanisms 132 in order to effectuate aspects of a determined trajectory and/or flight path of the aircraft 100.

Figure 1B:
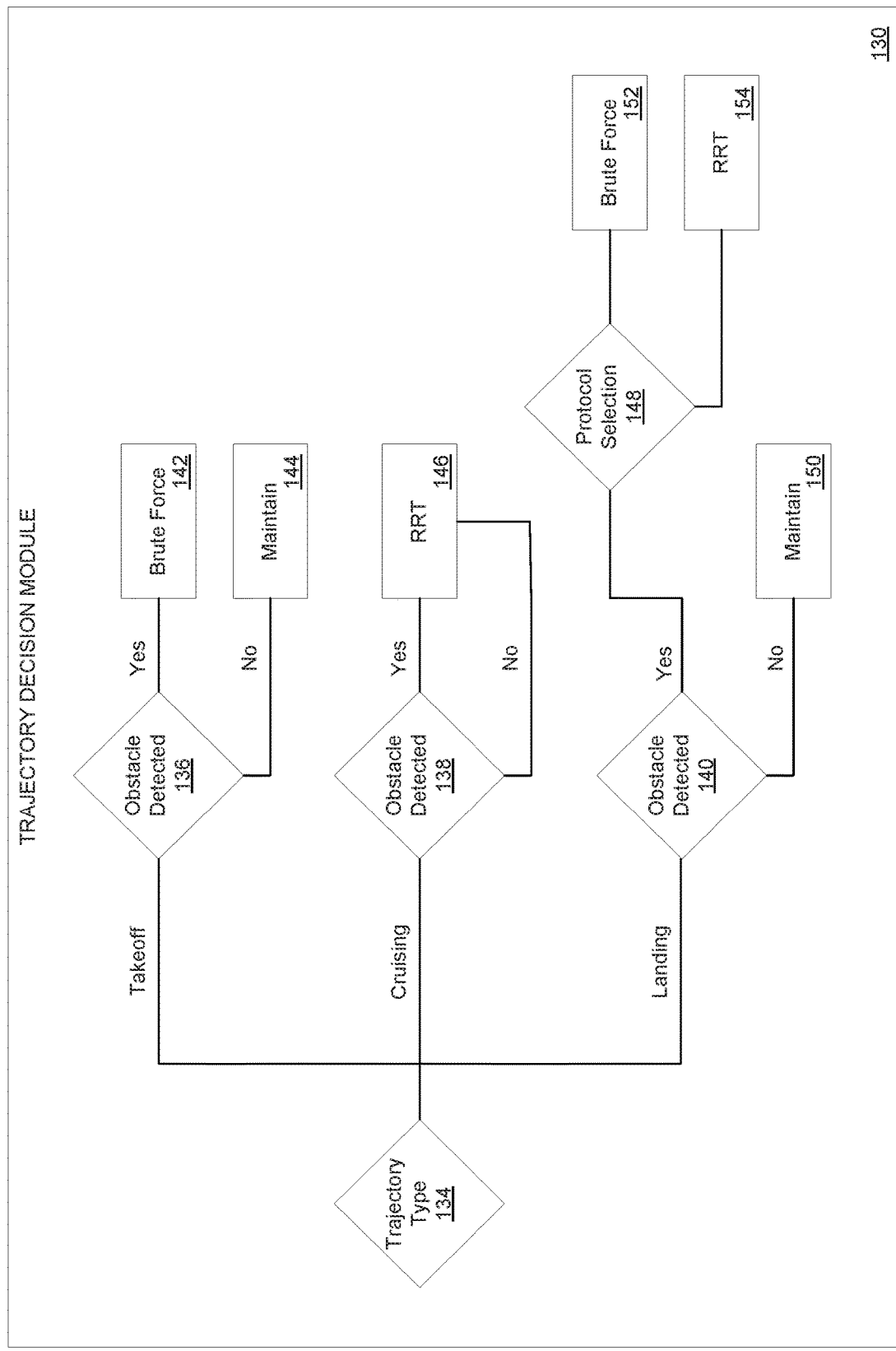
FIG. 1B illustrates a flowchart of a trajectory generations module of an aircraft, according to an example implementation.

FIG. 1B illustrates a flowchart of a trajectory decision module 130 of the aircraft 100, according to an example implementation. In particular, FIG. 1B shows a logical diagram describing a simplified method for determining a trajectory using the trajectory decision module 130. The trajectory decision module 130 may be a software program having instructions stored in memory on the trajectory generation system 128 and executable to perform functionality shown in FIG. 1B. The flowchart representing aspects of this functionality includes blocks 134-150.

At block 134, functions include using information indicative of one or more of the location, orientation, and altitude of the aircraft 100 received from the navigation system 112, or instructions received from the computing device 102, to determine a flight context of the aircraft 100.

FIG. 1B depicts a takeoff context, a cruising context, or a landing context, though other types of contexts are possible. For example, rather than having discrete contexts for determining a method of trajectory generation and selection, such decisions may be analog, and various weights can be applied to different factors, such as altitude, speed, rotational speed, user input, and/or other factors to determine a type of trajectory generation and selection protocol. Within examples, this may involve a cost-function that evaluates different trajectory solutions against one another having a desired output of minimal rotational jerk and/or linear jerk resulting from each given trajectory.

Turning back to FIG. 1B, at block 136, functions include determining, in a takeoff context, whether an obstacle is present. This may include receiving sensor data from the obstacle detection system 120, or receiving instructions from the computing device 102. If an obstacle has not been detected, a predetermined takeoff trajectory may be maintained (i.e. not changed) at block 144. If an obstacle has been detected, a brute-force approach 142 may be used to determine an updated waypoint for takeoff. In the context of this disclosure, the predetermined takeoff trajectory may be a first trajectory having a first flight path, and changing the flight path in accordance with the updated waypoint may be referred to as forming a second flight path of a second trajectory. Though a second flight path is formed, this flight path may only differ from the first flight path in certain respects in order to maintain stability and comfort during takeoff while avoiding obstacles. For example, the second flight path may be a rotated and/or translated version of the first flight path, as described further below. In the context of this disclosure, a brute force approach may refer to selecting from each available flight path within a set of constraints. For example, the set of constraints in the takeoff context may include a predetermined hover point for takeoff, a flight path of a predetermined trajectory for takeoff, and a clearance zone associated with a size of the aircraft 100.

Under some circumstances, selecting from each available flight path may be computationally taxing. However, in a takeoff context with appropriate constraints, this is ameliorated to a degree. For example, the available flight paths are initially constrained by a ground surface that prevents downward flight paths. Further limiting the potential flight paths to, for example, a subset of flight paths available in a zone surrounding the flight path of the predetermined trajectory of the aircraft 100, allows for reduced computational strain and a quicker flight path solution.

At block 138, functions include receiving functions include determining, in a cruising context, whether an obstacle is present. This may include receiving sensor data from the obstacle detection system 120, or receiving instructions from the computing device 102. If an obstacle has not been detected, or if an obstacle has been detected, the trajectory decision module 130 may use the RRT approach 146 to generate and select a flight path. Within examples, this may involve using a random selection of usable space in front of the aircraft 100. In this context, usable may refer to unobstructed space surrounding a current flight path of the aircraft 100. Within examples, a different type of approach may be used, such as a RRT* algorithm, Parti-game Directed RRT (PDRRT), Closed-Loop Rapidly-exploring Trees (CL-RRT), Rapidly-Exploring Random Graph (RRG), Voronoi diagrams, visibility graphs, receding horizon motion planning, or other algorithms for path generation and/or selection. Such approaches may be suited for quickly selecting a flight path through an open space where there are many (e.g., thousands) of usable options for a flight path.

At block 140, functions include determining, in a landing context, whether an obstacle is present. This may include receiving sensor data from the obstacle detection system 120, or receiving instructions from the computing device 102. If an obstacle has not been detected, a predetermined landing trajectory may be maintained (i.e. not changed) at block 150. If an obstacle has been detected, at block 148, functions include determining an updated waypoint for takeoff. For example, a brute-force approach may primarily or initially be used for generating and selecting trajectories, and, at block 148, a decision can be made to continue using the brute force approach (block 152) or to switch to an RRT approach (block 154), which may refine or override the brute force approach within particular contexts.

Further description of these contexts, and trajectory generation and selection are described below. For purposes of the following disclosure, a trajectory may relate to a velocity of the aircraft 100 and a path of the aircraft 100, and may be defined using a plurality of points connected to form a spline that defines the corresponding flight path. At certain points along the flight path, there may include waypoints that represent goals for the aircraft 100 to reach before changing a flight context. For example, a mission of the aircraft 100 may include a takeoff waypoint at which the aircraft 100 begins its takeoff, a cruising waypoint at the end of the predetermined takeoff trajectory, a descent waypoint at which the aircraft begins its transition to landing, and a landing waypoint at the end of the predetermined landing trajectory. These are addressed further below in relation to FIGS. 2, 3, 4A, 4B, 5, and 6.

Figure 2:
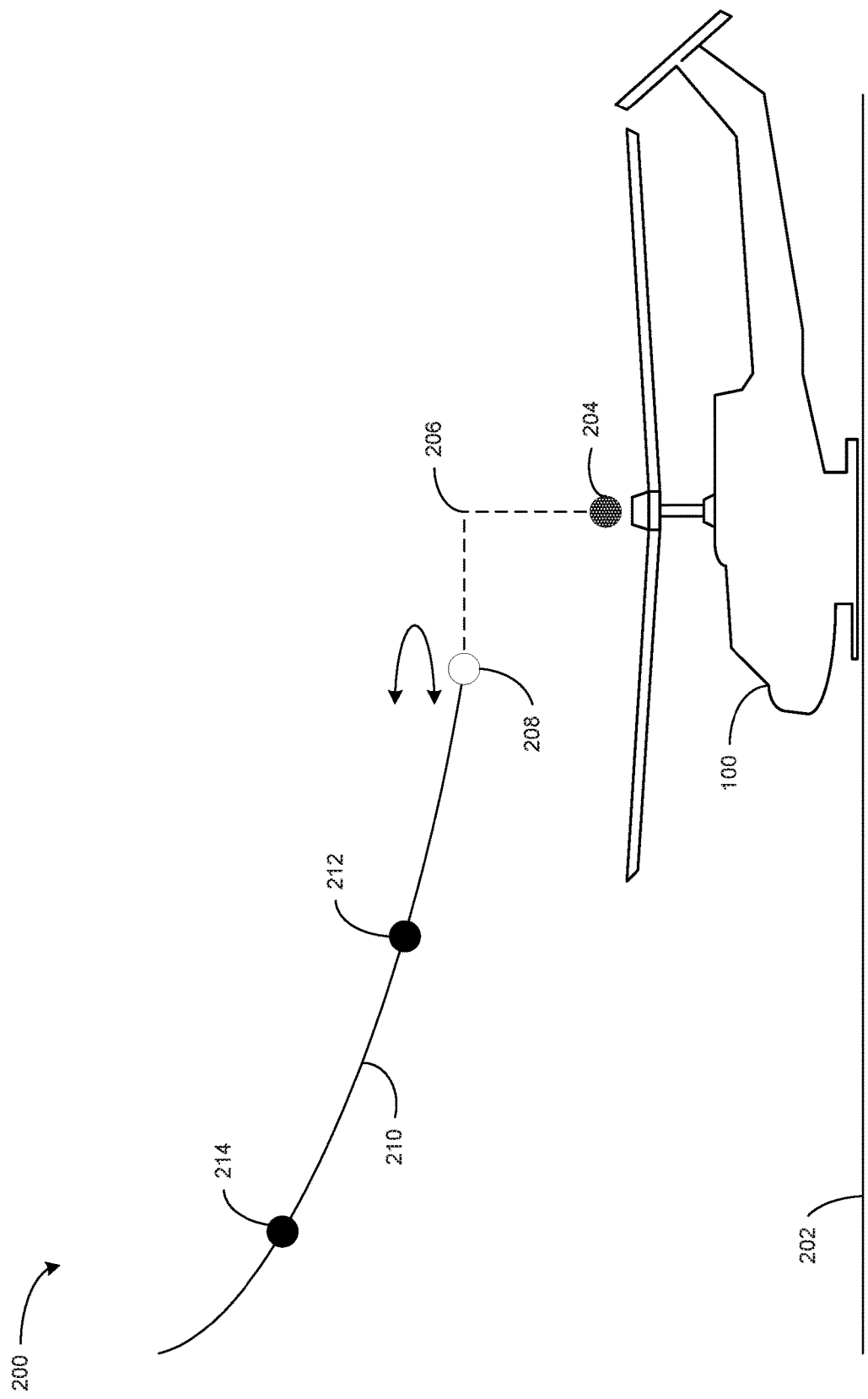
FIG. 2 illustrates an aircraft in a takeoff context, according to an example implementation.

FIG. 2 illustrates an aircraft 100 in a takeoff context 200, according to an example implementation. In particular, FIG. 2 shows an example scenario in which the aircraft 100 does not encounter an obstacle. In the takeoff context 200, the aircraft initially rests on a ground surface 202, and begins to approach a predetermined hover point 208 at which the predetermined takeoff trajectory 210 begins. From a takeoff point 204, the aircraft 100 follows a translation path 206 in which its position is translated to reach the predetermined hover point 208. The predetermined hover point 208 corresponds to a takeoff waypoint for the aircraft 100. At or before the predetermined hover point 208, the aircraft 100 may rotate to align with a direction of a flight path of the predetermined takeoff trajectory 210. Upon reaching the predetermined hover point, the obstacle detection system 120 may scan in a direction of the predetermined takeoff trajectory 210 (e.g., an area in front of the aircraft 100 defined in part by a size of the aircraft 100), or more generally in an environment surrounding the aircraft 100, to determine whether a portion of an obstacle obstructs the aircraft 100 from using the flight path of the predetermined takeoff trajectory 210.

In the present example scenario, no obstacle is detected, so the aircraft 100 continues along the predetermined takeoff trajectory 210. In other words, the aircraft 100 maintains the predetermined takeoff trajectory 210. As noted above, the trajectory is defined by one or more points (e.g., points 212 and 214) at points in space that are joined to form a spline that delineates the predetermined takeoff trajectory 210.

Within examples, forming the predetermined takeoff trajectory 210 may be determined in accordance with a machine learning algorithm that is trained using manned flights of the aircraft 100 and/or other aircraft. Within other examples, the predetermined takeoff trajectory 210 may be determined by combining a plurality of past flights of the aircraft 100. In still other examples, the predetermined takeoff trajectory 210 may be determined using simulated force data to minimize one or more flight parameters, such as linear jerk during takeoff (e.g., aiming for constant or near-constant acceleration during takeoff). In yet further examples, the predetermined takeoff trajectory 210 may be set by a user via the user interface 110. Other ways of forming the predetermined trajectory are possible.

Figure 3:
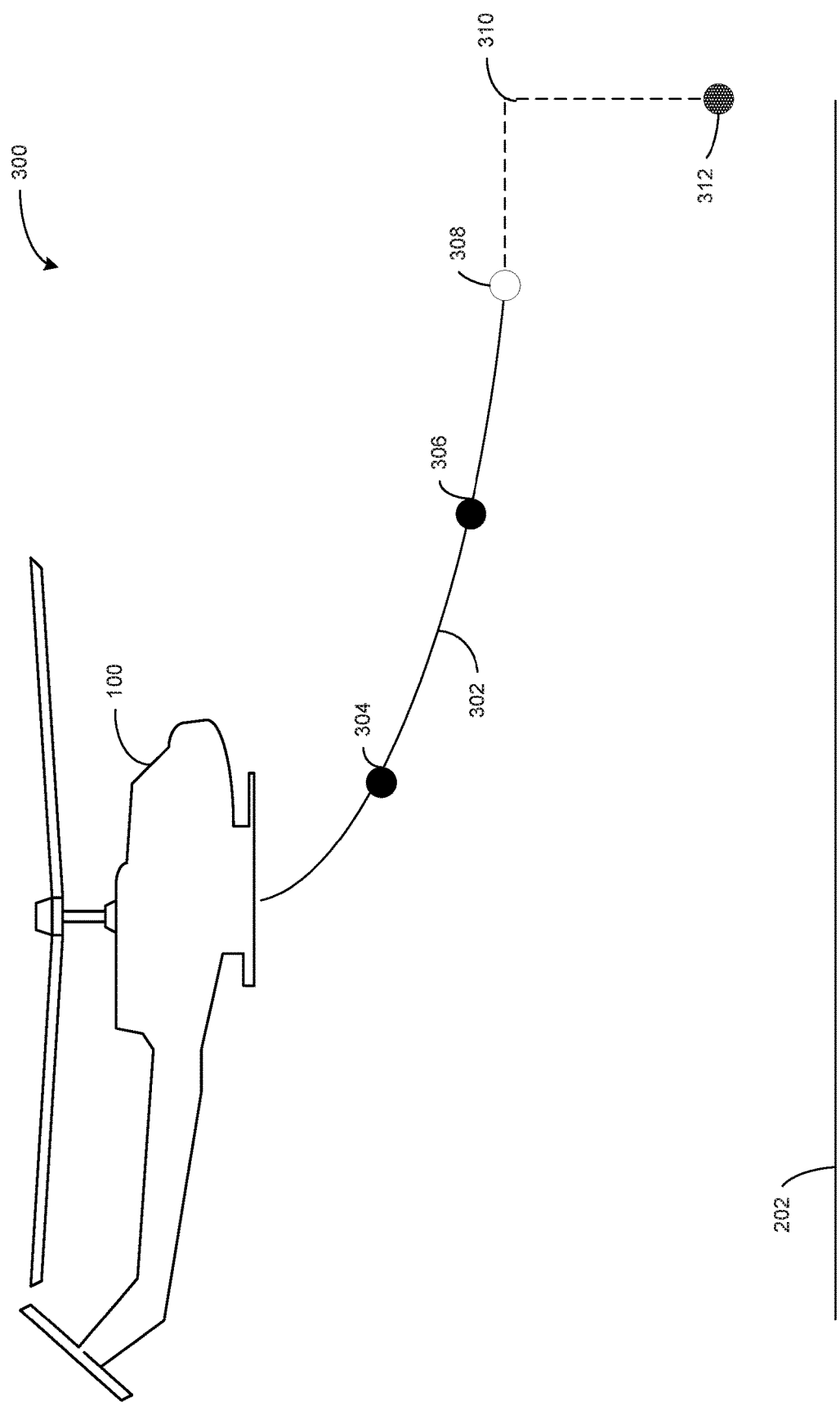
FIG. 3 illustrates an aircraft in a landing context, according to an example implementation.

FIG. 3 illustrates an aircraft 100 in a landing context 300, according to an example implementation. In particular, FIG. 3 shows an example scenario in which the aircraft 100 does not encounter an obstacle. In the landing context 300, the aircraft 100 follows a predetermined landing trajectory 302 defined by vectors 304 and 306 and ending at landing waypoint 306. At the landing waypoint 308, the aircraft 100 follows a translation path 310 to a landing point 312 at which the aircraft 100 makes contact with the ground surface 202. While following the predetermined landing trajectory 302, the obstacle detection system 120 may periodically scan for obstacles. Because, in the example scenario, no obstacle has been detected, the aircraft 100 maintains the predetermined landing trajectory 302.

Within examples, forming the predetermined landing trajectory 302 may be formed in a similar fashion to forming the predetermined takeoff trajectory 210 as described above with respect to FIG. 2. In particular, the predetermined landing trajectory may be formed to decelerate at a constant or near-constant rate.

Figure 4A:
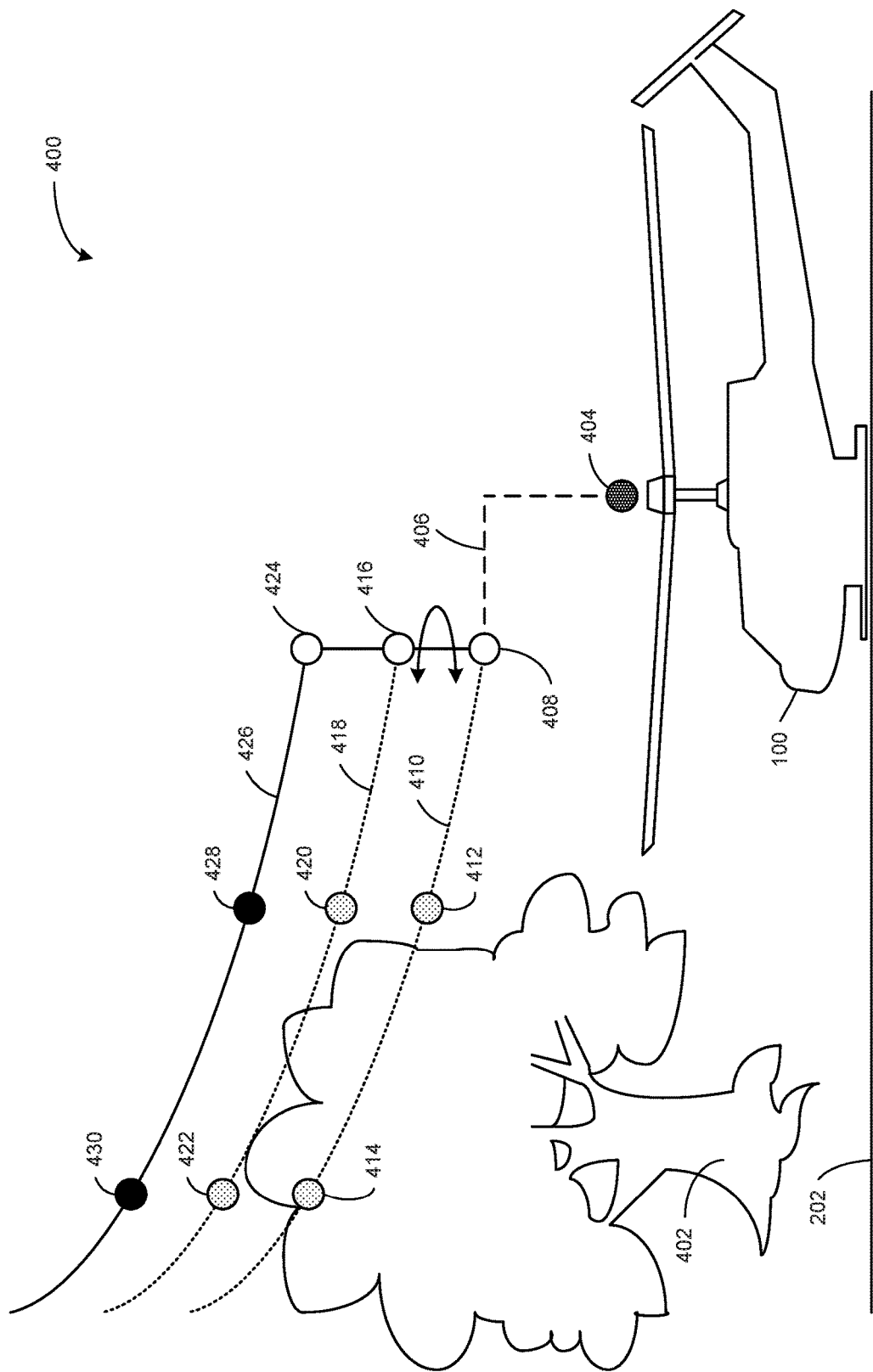
FIG. 4A illustrates a side view of an aircraft in another takeoff context, according to an example implementation.

FIG. 4A illustrates a side view of an aircraft 100 in another takeoff context 400, according to an example implementation. In particular, FIG. 4A shows an example scenario in which the aircraft 100 detects an obstacle 402. In the present example, the aircraft 100 starts on the ground surface 202 from a takeoff point 404. The aircraft 100 follows a translation path 406 to a predetermined hover point 408. In the present example, the aircraft 100 scans for obstacles at the predetermined hover point 408, and detects the obstacle 402, which is depicted as a tree. The obstacle 402 intersects with the first trajectory 410 defined by points 412 and 414, and thus it is determined that a takeoff waypoint and a corresponding hover point should be changed.

To change the takeoff waypoint, the aircraft 100 may iterate through a series of nominal hover points and orientations to determine whether any of them avoids the obstacle until one such hover point and/or orientation is deemed to avoid the obstacle. For example, this can involve rotating within a predefined range of orientations (e.g. 15 degrees to either side of the first trajectory 410) at predefined increments (e.g., in 5 degree increments). A predetermined takeoff trajectory (e.g., the first trajectory 410) may be maintained in this context other than rotating and/or translating the trajectory to match the nominal orientation that avoids the obstacle. In this manner, a brute force approach to generating a takeoff trajectory that limits which flight paths are considered and/or selected. Within examples, this may involve physically rotating and translating the aircraft 100 and scanning the environment at each nominal point while rotating and translating the aircraft 100. Within other examples, these rotations and/or translations may be performed virtually using sensor data obtained by the obstacle detection system 120.

In the present example, the aircraft 100 rotates through a series of nominal orientations at the predetermined hover point 408, but none of the nominal orientations avoids the obstacle 402. This process is repeated at a second hover point 416 in accordance with a nominal trajectory 418 defined by points 420 and 422, and again at a third hover point 424 in accordance with a second trajectory 426 defined by points 428 and 430. In the present example, at the third hover point 424 and at a nominal orientation of the aircraft 100, a takeoff waypoint is determined that avoids the obstacle. Accordingly, the aircraft 100 follows the second trajectory 426 from the hover point 424.

Figure 4B:
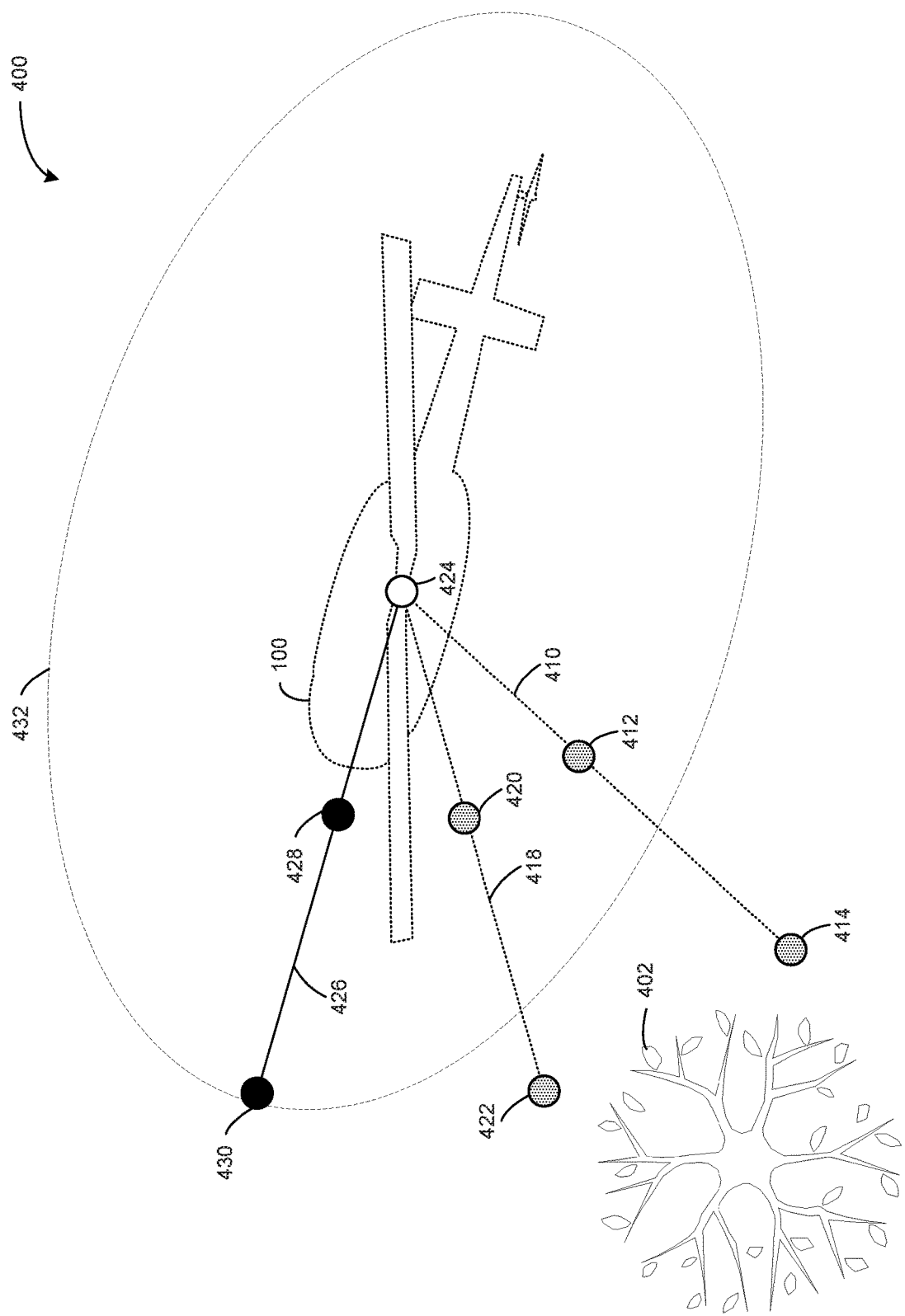
FIG. 4B illustrates a top view of an aircraft in another takeoff context, according to an example implementation.

FIG. 4B illustrates a top view of the aircraft 100 in another takeoff context 400, according to an example implementation. In particular, FIG. 4B shows a representation of how the aircraft 100 rotates through nominal orientations to determine a takeoff waypoint that allows for avoidance of the obstacle 402. As shown in FIG. 4B, in the present example, the first trajectory 410 defined by points 412 and 414, and the nominal trajectory 418 defined by points 420 and 422 would cause the aircraft 100 to intersect with the obstacle 402. However, the hover point 424 corresponding to the second trajectory 426 defined by points 428 and 430 does not intersect, and thus is selected as the takeoff waypoint for takeoff.

Determining that the obstacle does not obstruct the aircraft 100 may involve comparing a current position of the aircraft 100 to a detected position of the obstacle 402, and determining that substantially no portion of an obstacle falls within an area 432 defined by the potential takeoff waypoint (e.g., the hover point 424) a flight path starting at the potential takeoff waypoint (e.g., a flight path corresponding to the second trajectory 426), and a clearance zone associated with a size of the aircraft. For example, the rotors of the aircraft 100 may be 25 meters, and the clearance zone may include an additional clearance (e.g. 5 meters). Thus, selecting a takeoff waypoint may be determined in accordance with clearance zone of the aircraft 100.

Figure 5:
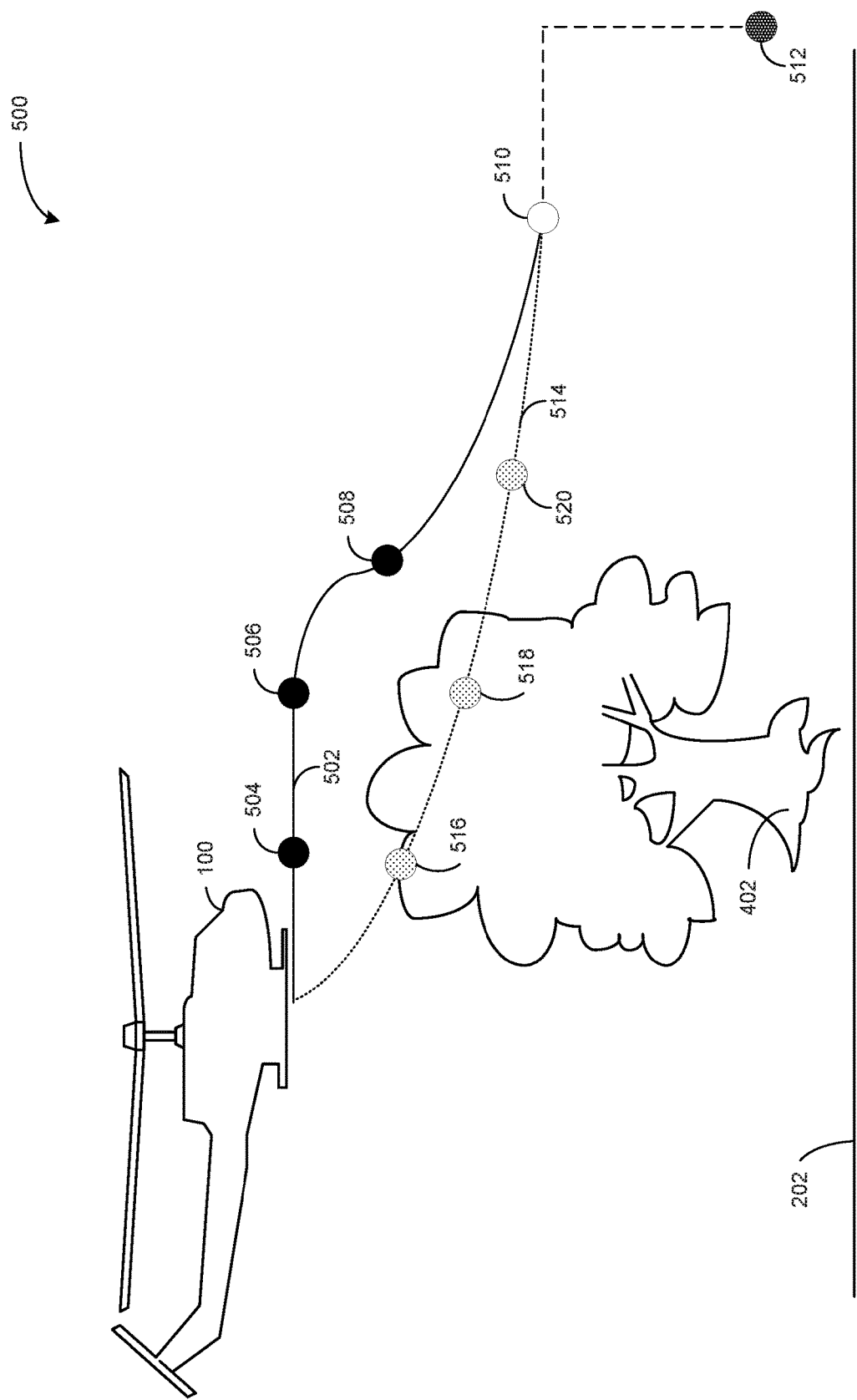
FIG. 5 illustrates an aircraft in another landing context, according to an example implementation.

FIG. 5 illustrates an aircraft 100 in another landing context 500, according to an example implementation. In particular, FIG. 5 shows an aircraft 100 using a brute force approach to land. As depicted in FIG. 5, the aircraft 100 begins on a predetermined trajectory 514 defined by points 516, 518, and 520, and ending at a hover point 510 corresponding to a landing waypoint. However, during descent, the aircraft 100 detects the obstacle 402 obstructing the predetermined trajectory 514. In the landing context 500, the aircraft 100 may use a flight path selection protocol to generate and select a different trajectory. In particular, the protocol corresponding to the landing context 500 may include using a brute force approach initially, and then using an RRT approach if the brute force approach, fails to provide a satisfactory trajectory. In other examples of this protocol, the brute force approach or the RRT can be used simultaneously and compared to determine which is more desirable. For example, points corresponding to each estimated trajectory can be entered into a cost function that is weighted to favor low linear jerk and low rotational jerk within further constraints associated with keeping the aircraft 100 airborne (such as speed and nose angle). In other examples, each respective trajectory may be evaluated using a trained machine learning model.

Qualitatively, the brute force approach may generally perform better than the RRT when passing over an obstacle, and the RRT approach may perform better than the brute force approach when passing around an obstacle. Accordingly, for purposes of example, in the landing scenario 500 a landing trajectory 502 is generated and selected that is defined by points 504, 506, and 508. Thus, within examples, the aircraft 100, and more specifically the computing device 102, may use the obstacle detection system 120 to determine that obstacle is below a bottom portion of the aircraft 100 in a current state, and responsively select the brute force approach for generating a new trajectory (e.g. to flatten the trajectory temporarily). Conversely, the computing device 102 may use the obstacle detection system 120 to determine that obstacle is in front of a front portion of the aircraft 100 in a current state, and responsively select the RRT approach for generating a new trajectory (e.g. to temporarily move the trajectory laterally). Other examples of operating the protocol for landing contexts are possible.

Figure 6:
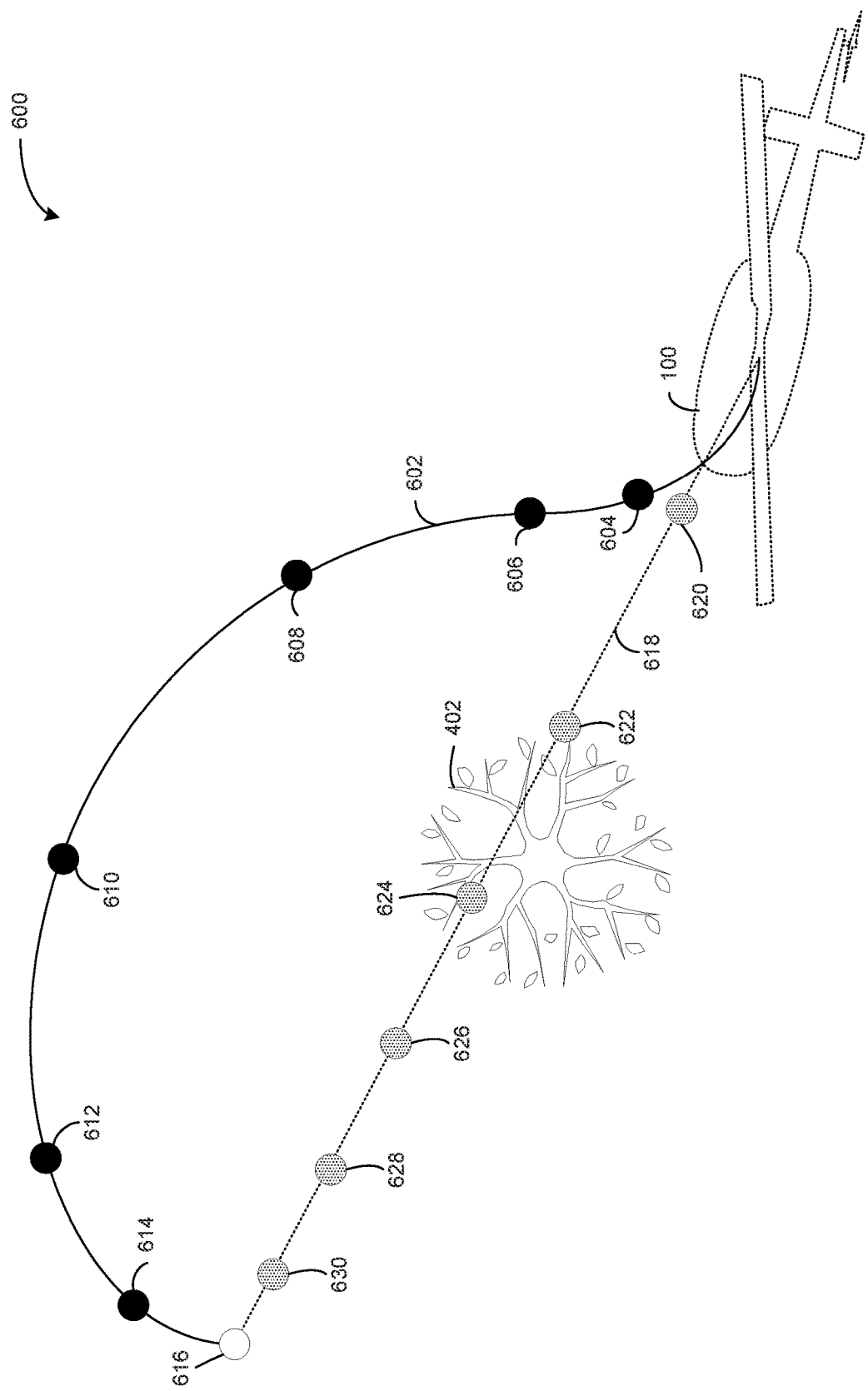
FIG. 6 illustrates an aircraft in another landing context, according to an example implementation.

FIG. 6 illustrates the aircraft 100 in another landing context 600, according to an example implementation. In particular, FIG. 6 shows a top view of the aircraft 100 avoiding the obstacle 402 laterally. In the present example, the predetermined trajectory 618 defined by points 620, 622, 624, 626, 628, and 630 leading to a hover point 616 intersect with the obstacle 402. In the present example, the obstacle 402 is in directly in front of the aircraft 100 (i.e., not below a bottom portion of the aircraft 100), so a lateral movement in accordance with the RRT approach is determined to be appropriate. In particular, the RRT approach generates the landing trajectory 602 defined by points 604, 606, 60, 610, 612, and 614, and ending at the hover point 616. Selecting the RRT approach over the brute force approach in accordance with the landing trajectory protocol may be executed as described above with respect to FIG. 5.

Figure 7:
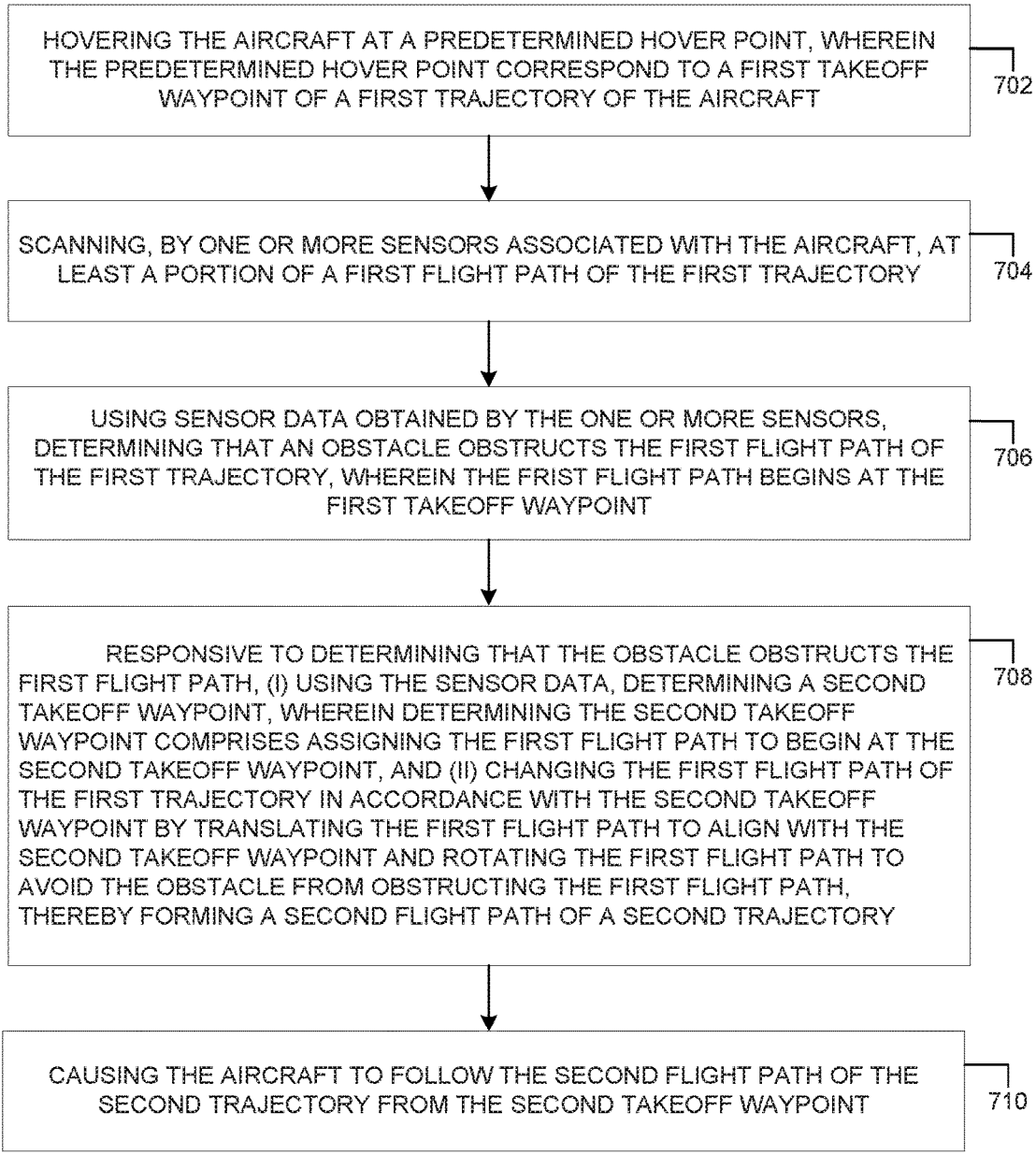
FIG. 7 illustrates a flowchart of a method of generating takeoff flight paths for navigating an aircraft, according to an example implementation.

FIG. 7 illustrates a flowchart of a method 700 of generating takeoff flight paths for navigating the aircraft 100, according to an example implementation. Method 700 shown in FIG. 7 presents an example of a method that could be used with the aircraft 100 shown in FIG. 1A, or with components of aircraft 100, such as the computing device 102 described with respect to FIG. 1A. Further, devices or systems may be used or configured to perform logical functions presented in FIG. 7. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 700 may include one or more operations, functions, or actions as illustrated by one or more of blocks 702-710. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 7, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 702, the method 700 includes hovering the aircraft 100 at the predetermined hover point 408, wherein the predetermined hover point 408 corresponds to a first takeoff waypoint of the first trajectory 410 of the aircraft. This may be performed in accordance with the illustration in FIGS. 4A and 4B, and the corresponding description.

At block 704, the method 700 includes scanning, by one or more sensors associated with the aircraft 100, at least a portion of a first flight path of the first trajectory 410. For example, scanning the portion of the first flight path may be performed by the obstacle detection system 120, as described above with respect to FIG. 1A, for example.

At block 706, the method 700 includes using sensor data obtained by the one or more sensors, determining that the obstacle 402 obstructs the first flight path of the first trajectory 410, wherein the first flight path begins at the first takeoff waypoint. Determining that the obstacle 402 obstructs the first flight path may include comparing a current position of the aircraft 100 to a detected position of the obstacle 402, and determining that at least a portion of the obstacle 402 falls within an area 432 corresponding to a clearance zone associated with a size of the aircraft 100.

At block 708, the method 700 includes, responsive to determining that the obstacle 402 obstructs the first flight path, (i) using the sensor data, determining a second takeoff waypoint of the first trajectory 410, wherein determining the second takeoff waypoint comprises assigning the first flight path to begin at the second takeoff waypoint, and (ii) changing the first flight path of the first trajectory 410 in accordance with the second takeoff waypoint by translating the first flight path to align with the second takeoff waypoint and rotating the first flight path to avoid the obstacle 402 from obstructing the first flight path, thereby forming the second flight path of the second trajectory 426. This may be performed in accordance with the illustration in FIGS. 4A and 4B, and the corresponding description. For example, the second trajectory 426 may correspond to changing the first flight path of the first trajectory 410 by rotating and/or translating the first trajectory 410 to takeoff from the second takeoff waypoint. As noted above, this may involve otherwise maintaining a predetermined trajectory for takeoffs of the aircraft 100 to preserve stability and comfort of the takeoff.

At block 710, the method 700 includes causing the aircraft 100 to follow the second flight path of the second trajectory 426 from the second takeoff waypoint. This may be performed in accordance with the illustration in FIGS. 4A and 4B, and the corresponding description.

Figure 8:
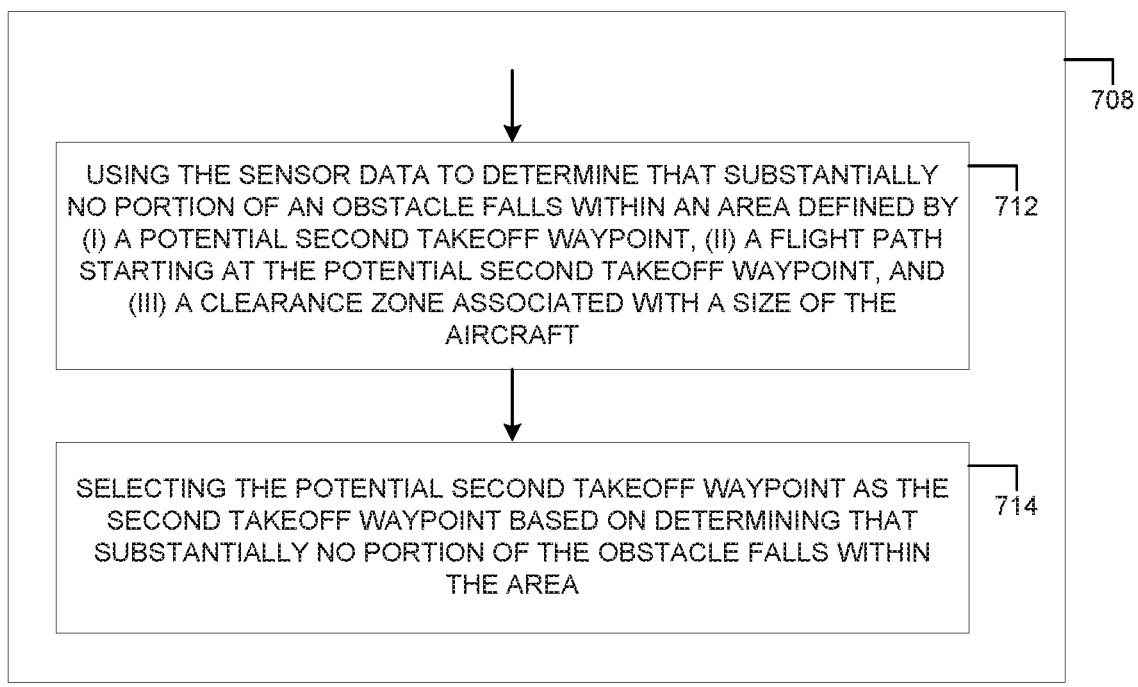
FIG. 8 shows a flowchart of another method for use with the method shown in FIG. 7, according to an example implementation.

FIG. 8 shows a flowchart of another method for use with the method 700 shown in FIG. 7, according to an example implementation. In particular, FIG. 8 shows blocks 712 and 714, which are performed in accordance with block 708. At block 712, the method 700 includes using the sensor data to determine that substantially no portion of the obstacle 402 falls within an area defined by (i) a potential second takeoff waypoint (e.g., the waypoint corresponding to the hover point 424 depicted in FIG. 4B), (ii) a flight path starting at the potential second takeoff waypoint (e.g., a flight path corresponding to the second trajectory 426 depicted in FIG. 4B), and (iii) a clearance zone (e.g., the area 432 described above with respect to FIG. 4B) associated with a size of the aircraft. For example, this may be performed as illustrated and described with respect to FIG. 4B. At block 714, the method 700 includes selecting the potential second takeoff waypoint as the second takeoff waypoint based on determining that substantially no portion of the obstacle 402 falls within the area. For example, this may be performed as illustrated and described with respect to FIG. 4B.

Figure 9:
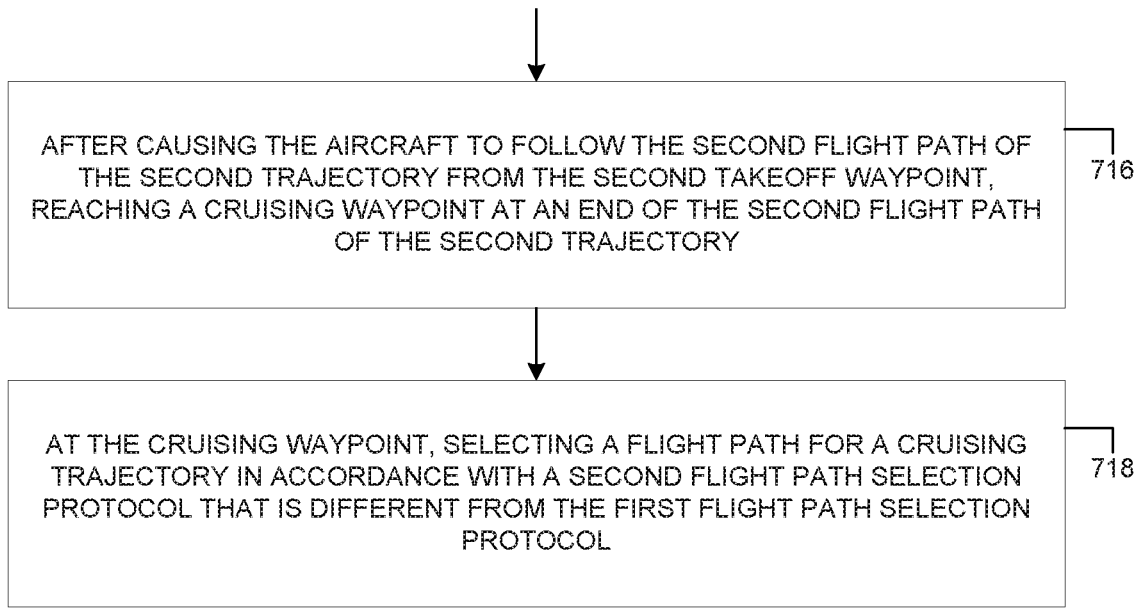
FIG. 9 shows a flowchart of another method for use with the method shown in FIG. 7, according to an example implementation.

FIG. 9 shows a flowchart of another method for use with the method 700 shown in FIG. 7, according to an example implementation. In particular, FIG. 9 shows an example wherein the second trajectory 426 is a takeoff trajectory determined in accordance with a first flight path selection protocol. Within this context, at block 716 the method 700 includes after causing the aircraft 100 to follow the second flight path of the second trajectory from the second takeoff waypoint, reaching a cruising waypoint at an end of the second flight path of the second trajectory 426. For example, the cruising waypoint may signal the start of a cruising flight context, as shown in FIG. 1B. At block 718, the method 700 further includes, at the cruising waypoint, selecting a flight path for a cruising trajectory in accordance with a second flight path selection protocol that is different from the first flight path selection protocol. For example, as depicted in FIG. 1B, this may involve switching from a brute force approach to an RRT approach for generating and selecting trajectories in the cruising context.

Figure 10:
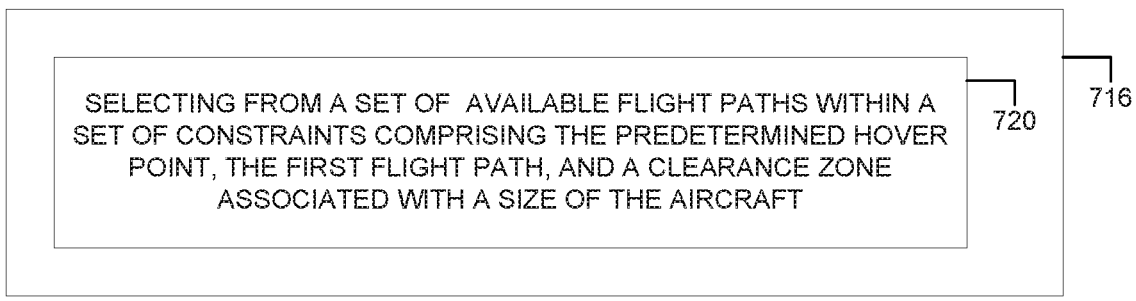
FIG. 10 shows a flowchart of another method for use with the methods shown in FIG. 5 and FIG. 9, according to an example implementation.

FIG. 10 shows a flowchart of another method for use with the methods shown in FIG. 5 and FIG. 9, according to an example implementation. In particular, FIG. 10 shows block 720. Block 720 is performed in accordance with block 716. At block 716, the method 700 include selecting from a set of available flight paths within a set of constraints comprising the predetermined hover point 408, the flight path, and a clearance zone associated with a size of the aircraft. For example, this may be performed in accordance with FIG. 4B and its corresponding description.

Figure 11:
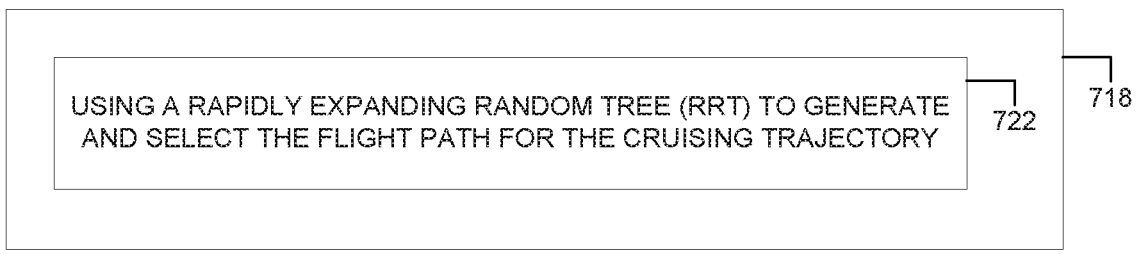
FIG. 11 shows a flowchart of another method for use with the methods shown in FIG. 7 and FIG. 9, according to an example implementation.

FIG. 11 shows a flowchart of another method for use with the methods shown in FIG. 7 and FIG. 9, according to an example implementation. In particular, FIG. 11 shows block 722. Block 722 is performed in accordance with block 718. At block 718, the method 700 includes using a Rapidly Expanding Random Tree (RRT) to generate and select the flight path for the cruising trajectory. This may be performed as described above with respect to, for example, FIGS. 1B, 5 and 6.

Figure 12:
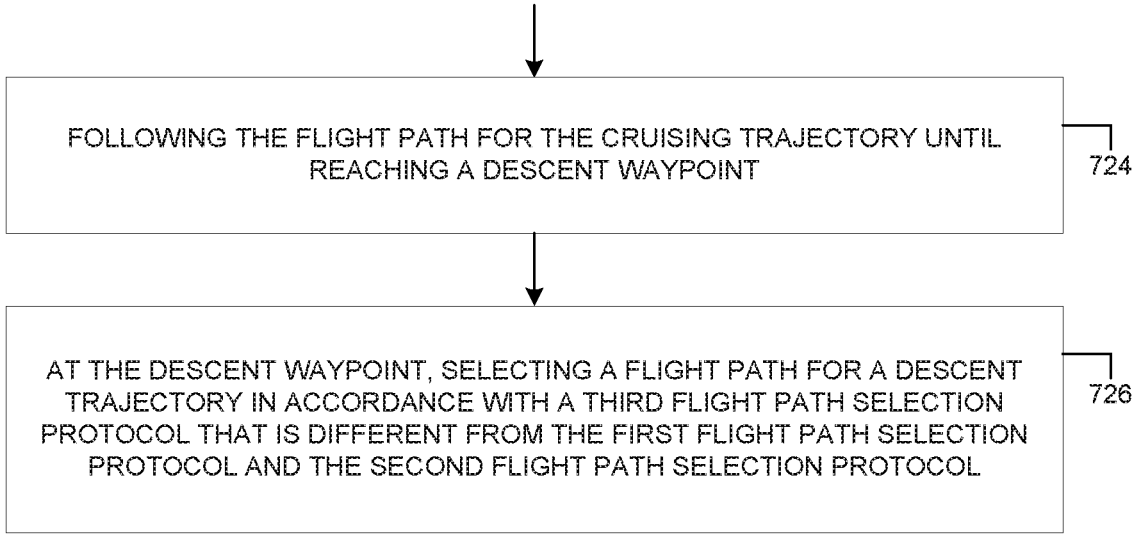
FIG. 12 shows a flowchart of another method for use with the methods shown in FIG. 7 and FIG. 9, according to an example implementation.

FIG. 12 shows a flowchart of another method for use with the methods shown in FIG. 7 and FIG. 9, according to an example implementation. In particular, FIG. 12 shows blocks 724 and 726. At block 724, the method 700 includes following the flight path for the cruising trajectory until reaching a descent waypoint. For example, the descent waypoint may signify an approach to a landing site. At block 726, the method 700 includes, at the descent waypoint, selecting a flight path for a descent trajectory in accordance with a third flight path selection protocol that is different from the first flight path selection protocol and the second flight path selection protocol. For example, the third flight path selection protocol may correspond to using either or both of the brute force approach and the RRT approach within landing contexts. This may be performed in accordance with FIGS. 5 and 6, and their corresponding description.

Figure 13:
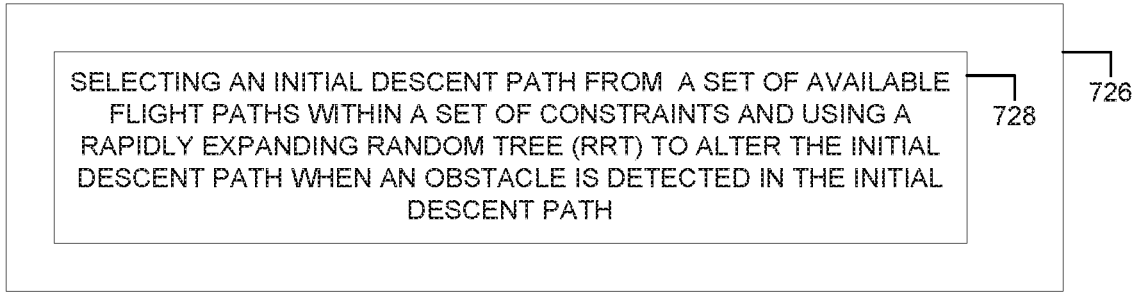
FIG. 13 shows a flowchart of another method for use with methods shown in FIG. 7, FIG. 9, and FIG. 12, according to an example implementation.

FIG. 13 shows a flowchart of another method for use with methods shown in FIG. 7, FIG. 9, and FIG. 12, according to an example implementation. In particular, FIG. 13 shows block 728. Block 728 is performed in accordance with block 726. At block 728, the method 700 includes selecting an initial descent path from a set of available flight paths within a set of constraints and using a Rapidly Expanding Random Tree (RRT) to alter the initial descent path when the obstacle 402 is detected in the initial descent path. For example, the brute force approach may be implemented if the obstacle 402 is below the aircraft 100, as shown in FIG. 5, while the RRT approach may be implemented if the obstacle 402 is directly in front of the aircraft 100 and the brute force approach does not generate a path around or over the obstacle, as shown in FIG. 6. Within examples, the brute force approach may be used any time during descent, but flight path generation may switch to RRT if the brute force approach does not generate a flight path. Within other examples, RRT may be used any time during descent that an obstacle is encountered, while the brute force approach is used otherwise.

Figure 14:
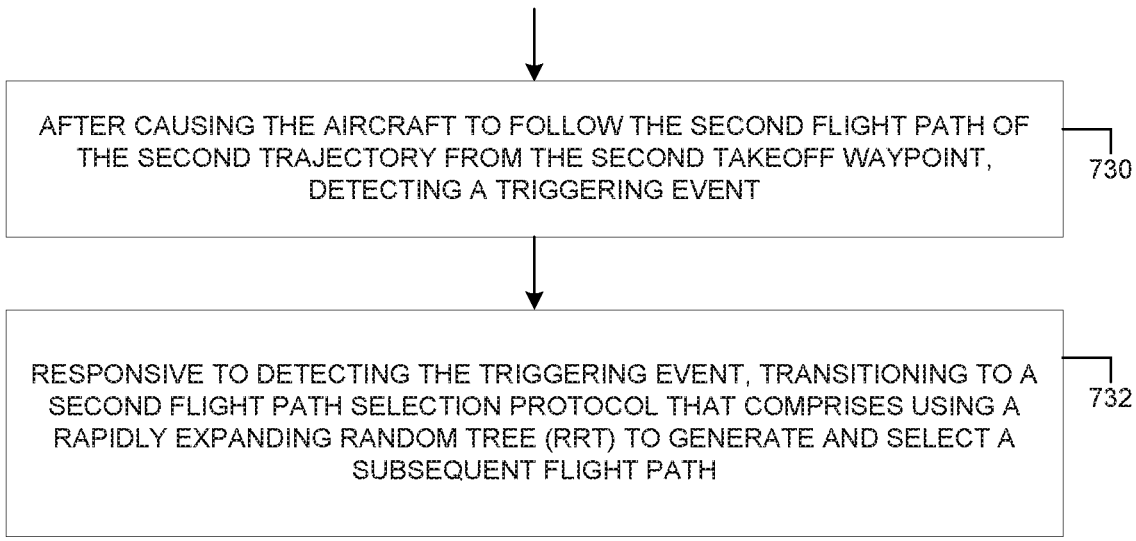
FIG. 14 shows a flowchart of another method for use with the method shown in FIG. 7, according to an example implementation.

FIG. 14 shows a flowchart of another method for use with the method 700 shown in FIG. 7, according to an example implementation. In particular, FIG. 14 shows blocks 730 and 732. Blocks 730 and 732 may be performed in a scenario wherein the second trajectory 426 is a takeoff trajectory determined in accordance with a first flight path selection protocol that comprises selecting from a set of available flight paths within a set of constraints. At block 730, the method 700 includes, after causing the aircraft 100 to follow the second flight path of the second trajectory 426 from the second takeoff waypoint, detecting a triggering event. For example, the triggering event may be reaching a threshold altitude (e.g., 60 meters Above Ground Level (AGL) or a maximum height above ellipsoid (HAE) of the aircraft), detecting that the trajectory of the aircraft 100 is leveling (e.g., determining that an angular difference between an orientation of the aircraft 100 and the ground surface 202 is less than 5%), or reaching a cruising waypoint, among other possibilities. At block 732, the method 700 further includes, responsive to detecting the triggering event, transitioning to a second flight path selection protocol that comprises using a Rapidly Expanding Random Tree (RRT) to generate and select a subsequent flight path. For example, this may be performed in a cruising context of the aircraft 100 as described above with respect to FIG. 1B.

Figure 15:
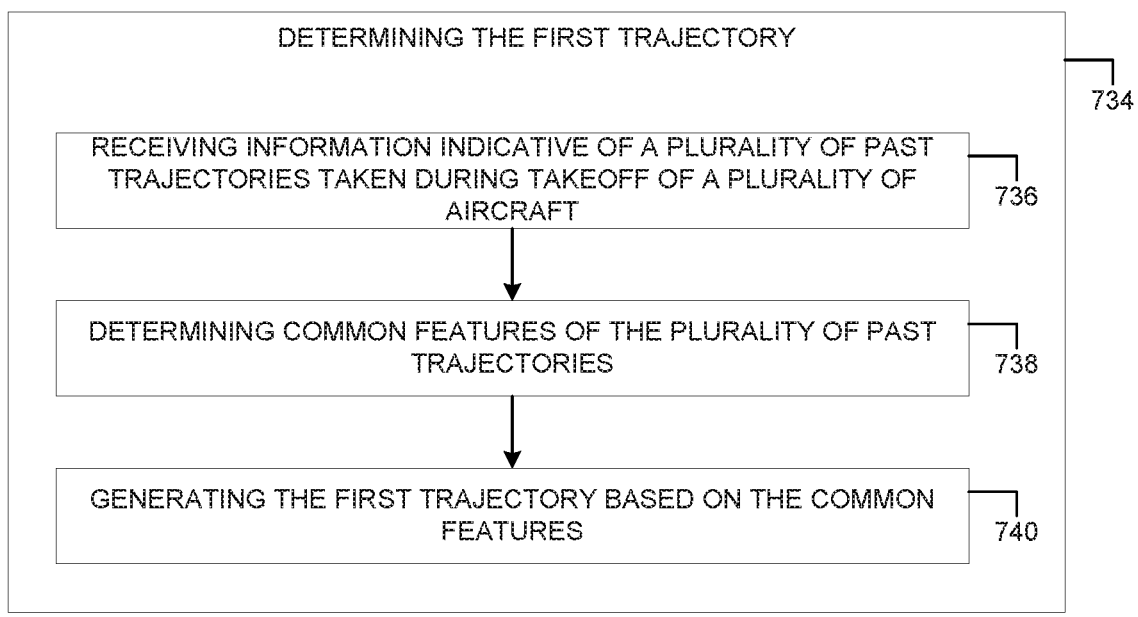
FIG. 15 shows a flowchart of another method for use with the method shown in FIG. 7, according to an example implementation.

FIG. 15 shows a flowchart of another method for use with the method shown in FIG. 7, according to an example implementation. In particular, FIG. 15 shows block 734, 736, 738, and 740. At block 734, the method 700 includes determining the first trajectory 410. Blocks 736, 738, and 740 are performed in accordance with block 734. At block 736, the method 700 includes receiving information indicative of a plurality of past trajectories taken during takeoff of a plurality of aircraft. For example, the information may be stored in the memory 106, a database on the aircraft 100, or a remote data store. At block 738, the method 700 further includes determining common features of the plurality of past trajectories. For example, this may involve normalizing each trajectory, determining a standard deviation for each point used to define the trajectories, and using an average value for points with low standard deviations (e.g., less than 2%). These points having low standard deviations may be considered common features. Other ways of extracting these features are possible. At block 740, the method 700 includes generating the first trajectory 410 based on the common features. For example, this may involve determining average values for points having low standard deviations, and using these to define the first trajectory 410.

Figure 16:
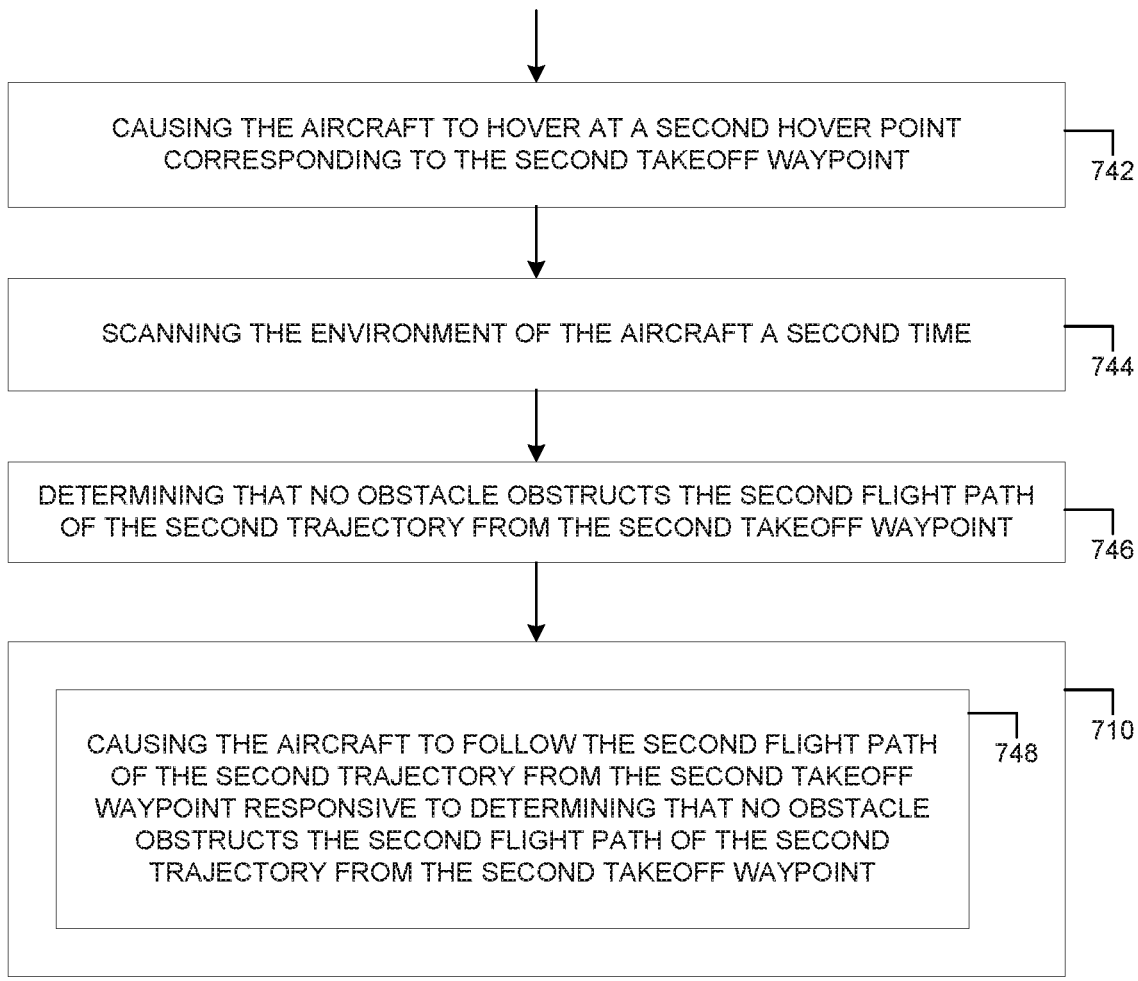
FIG. 16 shows a flowchart of another method for use with the method shown in FIG. 7, according to an example implementation.

FIG. 16 shows a flowchart of another method for use with the method shown in FIG. 7, according to an example implementation. In particular, FIG. 16 shows block 742-748. Blocks 742-748 are performed responsive to determining that the obstacle 402 obstructs the first flight path of the first trajectory 410. At block 742, the method 700 includes causing the aircraft 100 to hover at a second hover point (e.g. at the third hover point 424 depicted in FIGS. 4A and 4B)

corresponding to the second takeoff waypoint. At block 744, the method 700 includes scanning the environment of the aircraft 100 a second time. For example, this may be performed by the obstacle detection system 120. At block 746, the method 700 includes determining that no obstacle obstructs the second flight path of the second trajectory 426 from the second takeoff waypoint. Block 748 is performed in accordance with block 710. At block 748, the method 700 includes causing the aircraft 100 to follow the second flight path of the second trajectory 426 from the second takeoff waypoint responsive to determining that no obstacle obstructs the second flight path of the second trajectory 426 from the second takeoff waypoint. For example, this may be performed as described with respect to FIGS. 4A and 4B.

Figure 17:
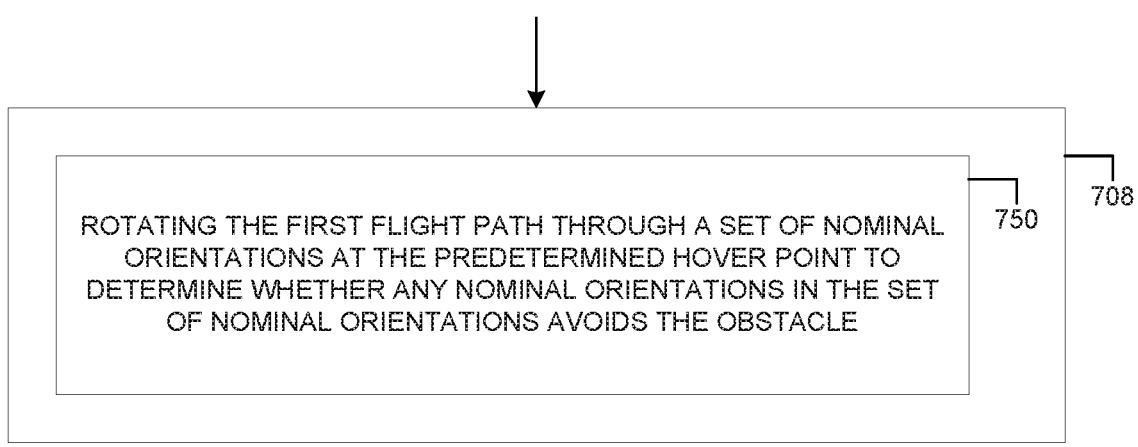
FIG. 17 shows a flowchart of another method for use with the method shown in FIG. 7, according to an example implementation.

FIG. 17 shows a flowchart of another method for use with the method 700 shown in FIG. 7, according to an example implementation. In particular FIG. 17 shows block 750. Block 750 is performed in accordance with block 708. At block 750, the method 700 includes rotating the first flight path through a set of nominal orientations at the predetermined hover point to determine whether any nominal orientations in the set of nominal orientations avoids the obstacle 402. For example, this may be performed as described above with respect to FIGS. 4A and 4B.

Figure 18:
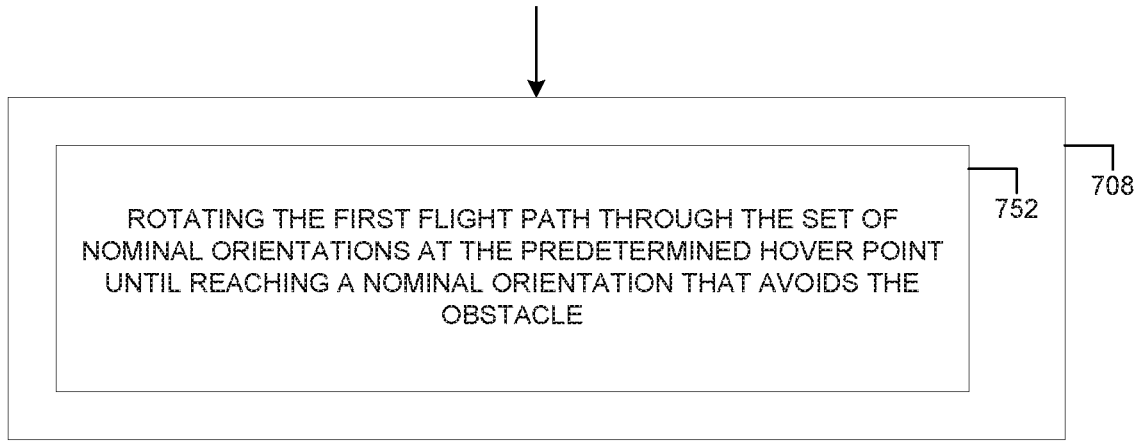
FIG. 18 shows a flowchart of another method for use with the methods shown in FIGS. 7 and 17, according to an example implementation.

FIG. 18 shows a flowchart of another method for use with the methods shown in FIGS. 7 and 17, according to an example implementation. In particular FIG. 18 shows block 752. Block 750 is performed in accordance with block 708. At block 750, the method 700 includes rotating the first flight path through the set of nominal orientations at the predetermined hover point until reaching a nominal orientation that avoids the obstacle 402. Though the predetermined hover point 408 shown in FIG. 4B does not depict this scenario, within examples, the aircraft 100 may rotate at the predetermined hover point and determine that one of the nominal orientations avoids the obstacle 402.

Figure 19:
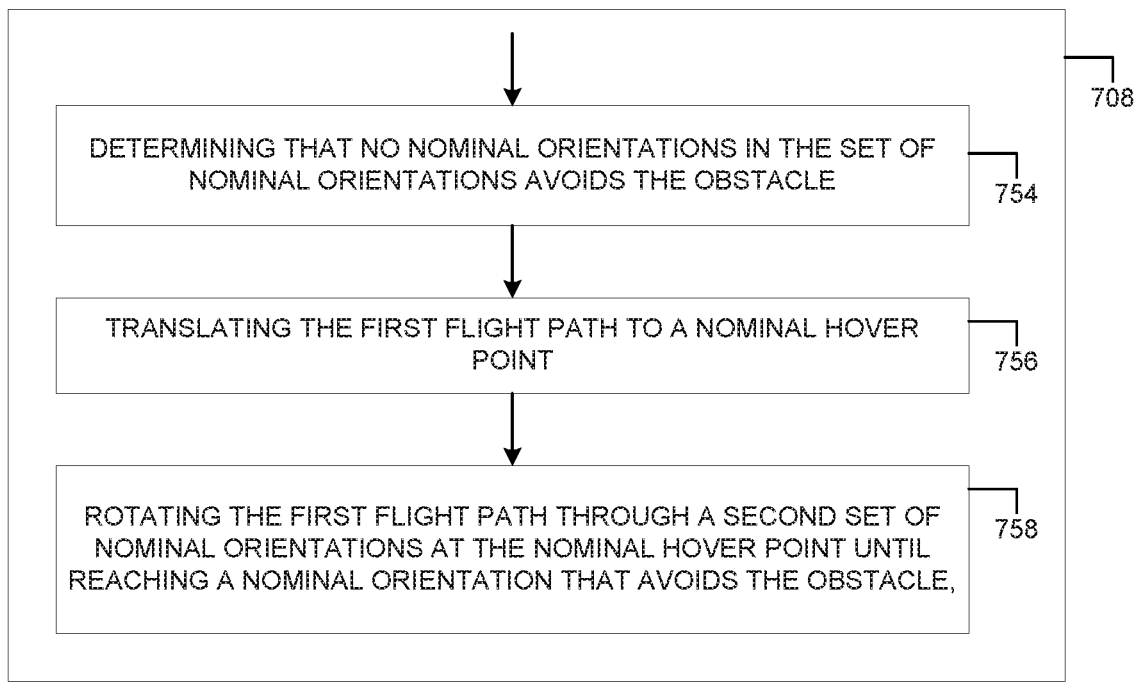
FIG. 19 shows a flowchart of another method for use with the methods shown in FIGS. 7 and 17, according to an example implementation.

FIG. 19 shows a flowchart of another method for use with the methods shown in FIGS. 7 and 17, according to an example implementation. In particular, FIG. 19 shows blocks 754, 756, and 758. Blocks 754, 756, and 758 are performed in accordance with block 708. At block 754, the method 700 includes determining that no nominal orientations in the set of nominal orientations avoids the obstacle 402. For example, this may be performed as depicted and described with respect to the first hover point 408 in FIG. 4A. At block 756, the method includes translating the first flight path to a nominal hover point. For example, this may be performed as depicted and described with respect to the third hover point 424 in FIG. 4A. At block 758, the method 700 includes rotating the first flight path through a second set of nominal orientations at the nominal hover point until reaching a nominal orientation that avoids the obstacle 402. Within examples, changing one or both of the predetermined hover point and the predetermined orientation comprises changing the predetermined hover point to match the nominal hover point and changing the predetermined orientation to match the nominal orientation that avoids the obstacle 402.

Within further implementations of the method 700, in accordance with block 708, determining the second takeoff waypoint includes determining a plurality of potential second takeoff waypoints that avoid the obstacle 402. For example, the aircraft 100 may determine a plurality of nominal orientations and nominal hover points that avoid the obstacle 402. Within these examples, functions may further include providing, by way of the user interface 110, selectable options corresponding to each of the plurality of potential second takeoff waypoints that avoid the obstacle 402. Functions may further include receiving, by way of the user interface 110, an indication of a selected potential second takeoff waypoint, wherein the second takeoff waypoint corresponds to the selected potential second takeoff waypoint. In such examples, the computing device 102 may assign the selected potential second takeoff waypoint as the second takeoff waypoint. In this manner, a user may trigger certain aspects of the takeoff or landing process. The computing device 102 may use such user inputs for purposes of training a machine learning model, for example.

Within still further implementations of the method 700, a system may include the aircraft 100 and a ground control system (not depicted in the Figures). In these examples, in accordance with block 708, determining the second takeoff waypoint includes receiving, from the ground control system, a range of acceptable heights (e.g., 10-25 meters) and orientations (e.g. substantially East or substantially Southeast) for taking off with the aircraft 100. Functions include, determining that the second takeoff waypoint falls within the range of acceptable heights and orientations. In these examples, selecting the second takeoff waypoint is performed responsive to determining that the second takeoff waypoint falls within the range of acceptable heights and orientations. In this manner, the aircraft 100 and related methods can be autonomously implemented at different landing sites having different regulations, standards, or rules governing landing and takeoff.

The described systems and methods described herein provide functionality that enables autonomous takeoff and landing of an aircraft. Selecting from a plurality of available protocols depending on context allows for these functions to be performed reliably and comfortably. Further, within examples, protocols are used that reduce the computational strain on systems for generating and selecting trajectories. Within still further examples, predetermined trajectories are maintained to the extent practicable in order to ensure consistent takeoff and landing procedures. Thus, the above-described systems and methods provide a robust, consistent, and comfortable experience for aircraft passengers.

By the term "substantially," "similarity," and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising:
hovering an aircraft at a first takeoff waypoint;
scanning, by one or more sensors associated with the aircraft, at least a portion of a first flight path defined by a trajectory that begins at the first takeoff waypoint;
using sensor data obtained by the one or more sensors, determining that an obstacle obstructs the first flight path;
responsive to determining that the obstacle obstructs the first flight path, translating the first flight path to generate, using the sensor data, a second flight path having the trajectory that begins at a second takeoff waypoint and avoids the obstacle; and
causing the aircraft to follow the second flight path.

2. The method of claim 1, further comprising:
using the sensor data to determine that substantially no portion of an obstacle falls within an area defined by (i) the second takeoff waypoint, (ii) the second flight path, and (iii) a clearance zone associated with a size of the aircraft; and
selecting the second takeoff waypoint based on determining that substantially no portion of an obstacle falls within the area.

3. The method of claim 1, wherein the trajectory is a determined in accordance with a first flight path selection protocol, the method further comprising:
after causing the aircraft to follow the second flight path, reaching a cruising waypoint at an end of the second flight path; and
at the cruising waypoint, selecting a third flight path for a cruising trajectory in accordance with a second flight path selection protocol that is different from the first flight path selection protocol.

4. The method of claim 3, wherein the first flight path selection protocol comprises selecting the first flight path from a set of available flight paths within a set of constraints comprising the first takeoff waypoint and a clearance zone associated with a size of the aircraft.

5. The method of claim 4, wherein the second flight path selection protocol comprises using a Rapidly Expanding Random Tree (RRT) to generate and select the third flight path for the cruising trajectory.

6. The method of claim 3, further comprising:
following the third flight path for the cruising trajectory until reaching a descent waypoint; and
at the descent waypoint, selecting a fourth flight path for a descent trajectory in accordance with a third flight path selection protocol that is different from the first flight path selection protocol and the second flight path selection protocol.

7. The method of claim 6, wherein the third flight path selection protocol comprises selecting an initial descent path from a set of available flight paths within a set of constraints and using a Rapidly Expanding Random Tree (RRT) to alter the initial descent path when an obstacle is detected in the initial descent path.

8. The method of claim 1, wherein the trajectory is a takeoff trajectory determined in accordance with a first flight path selection protocol that comprises selecting from a set of available flight paths within a set of constraints, the method further comprising:

after causing the aircraft to follow the second flight path, detecting a triggering event; and
responsive to detecting the triggering event, transitioning to a second flight path selection protocol that comprises using a Rapidly Expanding Random Tree (RRT) to generate and select a subsequent flight path.

9. The method of claim 1, further comprising determining the trajectory, wherein determining the trajectory comprises:
receiving information indicative of a plurality of past trajectories taken during takeoff of a plurality of aircraft;
determining common features of the plurality of past trajectories; and
generating the trajectory based on the common features.

10. The method of claim 1, further comprising, responsive to determining that the obstacle obstructs the first flight path:
causing the aircraft to hover at the second takeoff waypoint; and
determining that no obstacle obstructs the second flight path from the second takeoff waypoint,
wherein causing the aircraft to follow the second flight path comprises causing the aircraft to follow the second flight path from the second takeoff waypoint responsive to determining that no obstacle obstructs the second flight path from the second takeoff waypoint.

11. The method of claim 1, further comprising determining the second takeoff waypoint by rotating the first flight path through a set of nominal orientations at the first takeoff waypoint to determine whether any nominal orientations in the set of nominal orientations avoids the obstacle.

12. The method of claim 11, wherein determining the second takeoff waypoint further comprises:
rotating the trajectory through the set of nominal orientations at the second takeoff waypoint until reaching a nominal orientation that avoids the obstacle.

13. The method of claim 11, wherein determining the second takeoff waypoint further comprises:
determining that no nominal orientations in the set of nominal orientations avoids the obstacle; and
rotating the trajectory through a second set of nominal orientations at the second takeoff waypoint until reaching a nominal orientation that avoids the obstacle.

14. A system comprising:
one or more sensors; and
a computing device having a processor and memory storing instructions executable by the processor to perform functions comprising:
hovering an aircraft at a first takeoff waypoint;
scanning, by the one or more sensors, at least a portion of a first flight path defined by a trajectory that begins at the first takeoff waypoint;
using sensor data obtained by the one or more sensors, determining that an obstacle obstructs the first flight path;
responsive to determining that the obstacle obstructs the first flight path, translating the first flight path to generate, using the sensor data, a second flight path having the trajectory that begins at a second takeoff waypoint and avoids the obstacle; and
causing the aircraft to follow the second flight path.

15. The system of claim 14, wherein the one or more sensors comprises a light detection and ranging (LIDAR) device, and wherein the sensor data comprises three-dimensional (3D) point cloud data detected by the LIDAR device.

16. The system of claim 14, further comprising a user interface, the functions further comprising:

determining a plurality of potential second takeoff waypoints that avoid the obstacle;

providing, by way of the user interface, selectable options corresponding to each of the plurality of potential second takeoff waypoints that avoid the obstacle; and receiving, by way of the user interface, an indication of a selected potential second takeoff waypoint, wherein the second takeoff waypoint corresponds to the selected second takeoff waypoint.

17. The system of claim 14, the functions further comprising:

receiving, from a ground control system, a range of acceptable heights and orientations for taking off with the aircraft; and determining that the second takeoff waypoint falls within the range of acceptable heights and orientations.

18. A non-transitory computer readable medium having stored thereon instructions, that when executed by one or more processors of a computing device, cause the computing device to perform functions comprising:

hovering an aircraft at a first takeoff waypoint;

scanning, by one or more sensors associated with the aircraft, at least a portion of a first flight path defined by a trajectory that begins at the first takeoff waypoint;

using sensor data obtained by the one or more sensors, determining that an obstacle obstructs the first flight path;

responsive to determining that the obstacle obstructs the first flight path, translating the first flight path to generate, using the sensor data, a second flight path having the trajectory that begins at a second takeoff waypoint and avoids the obstacle; and causing the aircraft to follow the second flight path.

19. The non-transitory computer readable medium of claim 18, wherein the trajectory is a takeoff trajectory determined in accordance with a first flight path selection protocol, the functions further comprising:

after causing the aircraft to follow the second flight path, reaching a cruising waypoint at an end of the second flight path; and at the cruising waypoint, selecting a flight path for a cruising trajectory in accordance with a second flight path selection protocol that is different from the first flight path selection protocol.

20. The non-transitory computer readable medium of claim 19, the functions further comprising:

following the flight path for the cruising trajectory until reaching a descent waypoint; and at the descent waypoint, selecting a flight path for a descent trajectory in accordance with a third flight path selection protocol that is different from the first flight path selection protocol and the second flight path selection protocol.

* * * * *